(12) United States Patent
Blanding

(10) Patent No.: US 7,275,332 B2
(45) Date of Patent: Oct. 2, 2007

(54) MULTI-AXIS POSITIONING APPARATUS

(75) Inventor: Douglass L. Blanding, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 353 days.

(21) Appl. No.: 11/062,971

(22) Filed: Feb. 22, 2005

(65) Prior Publication Data

US 2006/0186285 A1  Aug. 24, 2006

(51) Int. Cl.
*B23Q 16/00* (2006.01)
*B23Q 1/25* (2006.01)

(52) U.S. Cl. .......................... 33/568; 33/1 M; 33/573; 248/178.1; 269/71

(58) Field of Classification Search ............... 33/1 M, 33/556, 558, 572, 573; 108/7, 147; 248/178.1, 248/188.1, 188.2, 188.6, 560, 614, 618, 653, 248/654; 250/442.11; 269/16, 71, 136, 269/901, 910

See application file for complete search history.

(56) References Cited

U.S. PATENT DOCUMENTS

| | | | |
|---|---|---|---|
| 4,607,578 A * | 8/1986 | Inoue et al. ................. 108/145 |
| 4,651,589 A * | 3/1987 | Lambert ....................... 74/469 |
| 4,686,440 A * | 8/1987 | Hatamura et al. ........... 318/646 |
| 4,976,582 A * | 12/1990 | Clavel ......................... 414/729 |
| 5,041,060 A | 8/1991 | Hendershot ................... 464/86 |
| 5,052,119 A * | 10/1991 | Eventoff ....................... 33/569 |
| 5,112,012 A * | 5/1992 | Yuan et al. .................. 244/165 |
| 5,420,489 A * | 5/1995 | Hansen et al. .......... 318/568.18 |
| 5,451,134 A * | 9/1995 | Bryfogle ...................... 414/680 |
| 5,489,168 A * | 2/1996 | Sheldon et al. ............. 409/235 |
| 5,771,747 A * | 6/1998 | Sheldon ................... 74/490.01 |
| 5,836,082 A * | 11/1998 | Sheldon ........................ 33/556 |
| 5,865,063 A * | 2/1999 | Sheldon ................... 74/490.01 |
| 5,870,834 A * | 2/1999 | Sheldon ........................ 33/556 |
| 5,909,939 A * | 6/1999 | Fugmann ...................... 33/503 |
| 6,246,052 B1 * | 6/2001 | Cleveland et al. .......... 250/234 |
| 6,260,428 B1 * | 7/2001 | Clement .................... 74/89.45 |
| 6,286,225 B1 * | 9/2001 | Schimmels et al. ........... 33/645 |
| 6,328,656 B1 | 12/2001 | Uchikawa et al. .......... 464/183 |
| 6,408,526 B1 * | 6/2002 | Montesanti et al. ......... 33/1 M |

(Continued)

FOREIGN PATENT DOCUMENTS

JP  2002093693 A * 3/2002

OTHER PUBLICATIONS

Douglass L. Blanding; "Exact Constraint: Machine Design Using Kinematic Principles",1999, pp. 63-69.

*Primary Examiner*—R. Alexander Smith

(57) ABSTRACT

An apparatus for supporting a platform (84) relative to a base (82), has first, second, and third flexible shaft couplings (80). Each flexible shaft coupling (80) is mechanically coupled between the platform (84) and the base (82). Each flexible shaft coupling (80) has a rigid intermediate member (12) and a platform coupling (104) with a plurality of folded sheet flexures (20). Each folded sheet flexure (20) is coupled to the rigid intermediate member (12) on one side of a fold (36) and coupled to the platform (84) on the opposite side of the fold (36). Each flexible shaft coupling (80) also has a base coupling (102) with a plurality of folded sheet flexures (20) wherein each folded sheet flexure (20) is coupled to the rigid intermediate member (12) on one side of a fold (36) and coupled to the base (82) on the opposite side of the fold (36).

22 Claims, 25 Drawing Sheets

U.S. PATENT DOCUMENTS

| | | | |
|---|---|---|---|
| 6,431,987 B1 * | 8/2002 | Tushar et al. | 464/112 |
| 6,453,566 B1 * | 9/2002 | Bottinelli et al. | 33/1 M |
| 6,514,146 B1 | 2/2003 | Shinozuka | 464/79 |
| 6,695,705 B2 | 2/2004 | Stervik | 464/79 |
| 6,757,985 B2 | 7/2004 | Hall | 33/503 |
| 6,758,623 B2 * | 7/2004 | Bushey | 403/57 |
| 2004/0261276 A1 * | 12/2004 | Walker et al. | 33/1 M |

* cited by examiner

MULTI-AXIS POSITIONING APPARATUS

CROSS REFERENCE TO RELATED APPLICATIONS

Reference is made to the following commonly-assigned copending U.S. patent application Ser. No. 10/977,460, filed Oct. 29, 2004, entitled FLEXIBLE COUPLING, by Douglass Blanding; and U.S. patent application Ser. No. 10/978,191, filed Oct. 29, 2004, entitled COUPLING APPARATUS by Douglass Blanding; the disclosures of which are incorporated herein.

FIELD OF THE INVENTION

This invention generally relates to positioning apparatus and more particularly relates to an apparatus for precise positioning of a platform in up to three orthogonal axes.

BACKGROUND OF THE INVENTION

There is a need in many applications to provide adjustable positioning of an object relative to the three orthogonal Cartesian axes (x, y, and z), while at the same time providing rigid constraint against tipping, tilting, or rotation about these axes. Example applications for this type of positioning capability include medical, instrumentation, and manufacturing applications.

There are basically two different design approaches used for precision positioning of an object or its supporting platform relative to three orthogonal Cartesian x, y, and z axes. In the more conventional approach, some type of "translation stage" is used as the mechanism for providing adjustable translational positioning along one axis while also providing rigid constraint against motion in every other mechanical degree of freedom. Where it is desirable to provide adjustable translational positioning along each of three independent axes, it is common practice to use three cascaded translation stages. While this approach achieves the intended result (that is, adjustable positioning in the three orthogonal translational degrees of freedom with constraint against rotational motion), it typically does so at the cost of complex, expensive, and redundant hardware. Each translation stage must provide constraint against rotation in three degrees of freedom and against translation in 2 degrees of freedom. This type of solution, then, solves the problem of constraining rotations three times, once in each translation stage. In this first design approach, the connections made to the object are "cascaded".

In contrast, a configuration following the second design approach would make 6 connections directly to the body, where each connection constrains one degree of freedom. An example of this second approach would be the well known "Stewart Platform," which contains 6 struts connected to the body in a pattern of 3 intersecting pairs. The Stewart platform can be made to provide adjustable constraint in up to 6 degrees of freedom by controlling the length of each of the struts. However, the Stewart platform has the limitation that strut length adjustments do not produce orthogonal motion of the platform in Cartesian coordinates. Position adjustments of the Stewart platform are highly "coupled," so that it is not possible to change the length of one strut and achieve a pure motion in only one Cartesian degree of freedom. This is in contrast to the adjustments of the individual translation stages of the first design approach.

Another example of the second design approach employs orthogonally disposed flexible couplings within a positioning apparatus. For example, U.S. Pat. No. 6,757,985 (Hall) discloses an apparatus for positioning a work platform that employs multiple flexible shaft couplings, such as bellows couplings. These couplings are aligned along Cartesian x, y, and z axes and are connected between a base and a ball joint attached to the work platform. In contrast to the more conventional approach using cascaded translation stages, this second design approach uses a number n of individual connections, where each connection is intended to constrain 1 degree of freedom. For example, to allow a body 1 degree of freedom, 5 constraining connections would be made between the body and a reference base. In the U.S. Pat. No. 6,757,985 apparatus, each coupling provides a connection that constrains a single degree of freedom.

The U.S. Pat. No. 6,757,985 apparatus has some advantages because it provides the ability to achieve independent Cartesian axis motions without redundant hardware. Because of this, the U.S. Pat. No. 6,757,985 apparatus combines the best of both design approaches. However, the U.S. Pat. No. 6,757,985 apparatus can be further improved by using couplings with improved characteristics and by integrating simpler means for making translation adjustments. Among the characteristics of a coupling which would make it ideally suited for use in this type of apparatus are:
  (i) High wind-up stiffness
  (ii) Low stiffness in degrees of freedom other than wind-up
  (iii) Simple, low cost construction
  (iv) Extended range of motion along a central axis (z direction).

Thus, it can be seen that there is a need for an apparatus that allows independently controlled, precision positioning of an object in three orthogonal axes, using moderately priced components that do not requiring costly machining or assembly, and that is capable of improved performance over conventional positioning systems.

SUMMARY OF THE INVENTION

It is an object of the present invention to provide an apparatus for supporting a platform relative to a base, comprising first, second, and third flexible shaft couplings, each flexible shaft coupling mechanically coupled between the platform and the base, each flexible shaft coupling comprising:
  a) a rigid intermediate member;
  b) a platform coupling comprising a plurality of folded sheet flexures, wherein each folded sheet flexure is:
    i) coupled to the rigid intermediate member on one side of a fold; and
    ii) coupled to the platform on the opposite side of the fold;
  c) a base coupling comprising a plurality of folded sheet flexures, wherein each folded sheet flexure is:
    i) coupled to the rigid intermediate member on one side of a fold; and
    ii) coupled to the base on the opposite side of the fold.

It is a feature of the present invention that it employs couplings using an arrangement of folded sheet flexures.

It is an advantage of the present invention that it provides a positioning solution that can be constructed from low cost shaft and flexure components. The positioning mechanism of the present invention can be suitably scaled in size to meet the requirements for small-scale or large scale applications.

It is another advantage of the present invention that it provides a coupling that can be easily attached between a base and platform using conventional fasteners or fittings.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Flexible Shaft Couplings

In order to understand the operation and features of the present invention, it is first instructive to describe conventional flexible shaft couplings and review coordinate axes definitions. Flexible shaft couplings are used in numerous applications for transmitting rotational movement, or providing rotational constraint, between a drive member and a load member, where the drive and load members can be angularly or laterally misaligned to some degree. Among the many solutions for rotational transmission between misaligned components include the Cardan cross-style coupling invented in the sixteenth century by Girolamo Cardano and widely used in industrial and vehicular applications, allowing shaft misalignment of as much as 10 degrees or more. The constant velocity (CV) joint is another type of flexible shaft coupling that advantageously provides unity velocity transmission between misaligned shafts. Other flexible shaft coupling solutions include bellows couplings, as described in a number of patents including U.S. Pat. Nos. 6,514,146 (Shinozuka); 6,328,656 (Uchikawa et al.); and 6,695,705 (Stervik). Other types of couplings use disc-shaped structures as disclosed in U.S. Pat. No. 5,041,060 (Hendershot). Commercially available flexible couplings include power transmission couplings using HELI-CAL® Flexure technology, manufactured by Helical Products Company, Inc., Santa Maria, Calif.

Figure 1:
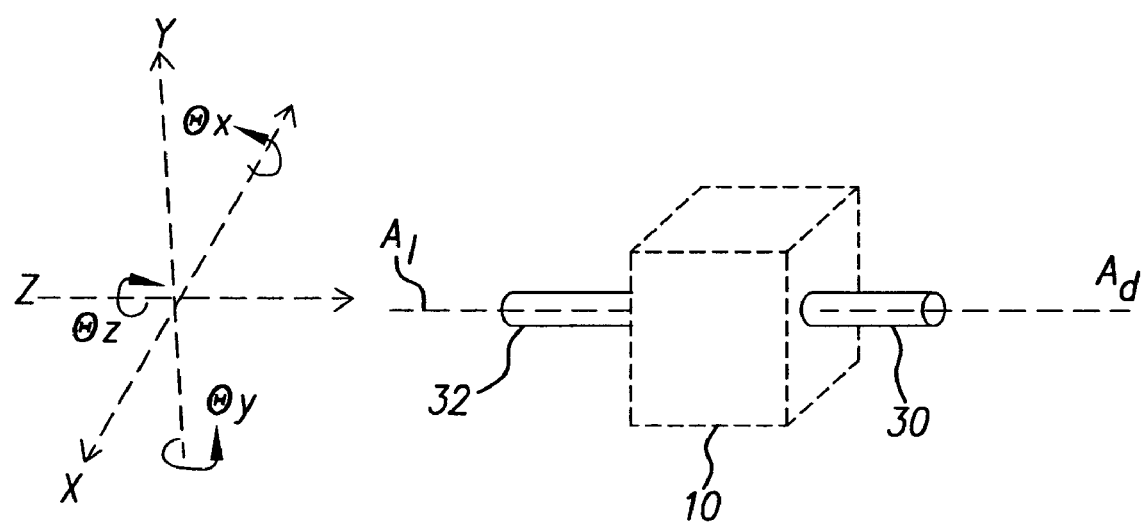
FIG. 1 is a perspective block diagram view showing a generic coupling and establishing reference axes and terms used in the present application.

Couplings can be broadly classified in terms of their constraints and degrees of freedom according to the standard orthogonal XYZ coordinate system shown in FIG. 1. Six degrees of freedom are of interest: translation in x, y, and z and rotation about these axes, $\theta x$, $\theta y$, and $\theta z$. A coupling 10 provides a constraint to movement along or about at least one of the XYZ axes and a degree of freedom along or about one or more of the other axes. For the purposes of general description, coupling 10 can be considered to couple a drive member 30 with a load member 32. It is instructive to note that the terms "drive" and "load" are somewhat arbitrary as used in the present application. That is, the designation of drive member 30 and load member 32 simply serves to distinguish the two elements that are coupled; the particular mechanism in which coupling 10 is used determines whether "drive" and "load" are the most appropriate terms.

In terms of the well known orthogonal XYZ coordinate system that is conventionally used, an ideal flexible shaft coupling provides five degrees of freedom (DoF), namely x, y, $\theta x$, $\theta y$, and z, with constraint only relative to the axis of rotation ($\theta z$ rotation). Preferred operating characteristics of shaft couplings include a high level of torsional or wind-up stiffness and zero backlash. Conventional shaft coupling solutions, particularly those providing CV behavior, are typically complex and costly. The level of complexity and corresponding cost depend, in large part, on the application. Shaft couplings for automotive and industrial applications are, of course, relatively complex and expensive. Couplings used for transmitting torque from small motors or couplings used with instrumentation, meanwhile, can be much cheaper.

Apparatus for Multi-axis Positioning

Figure 12:
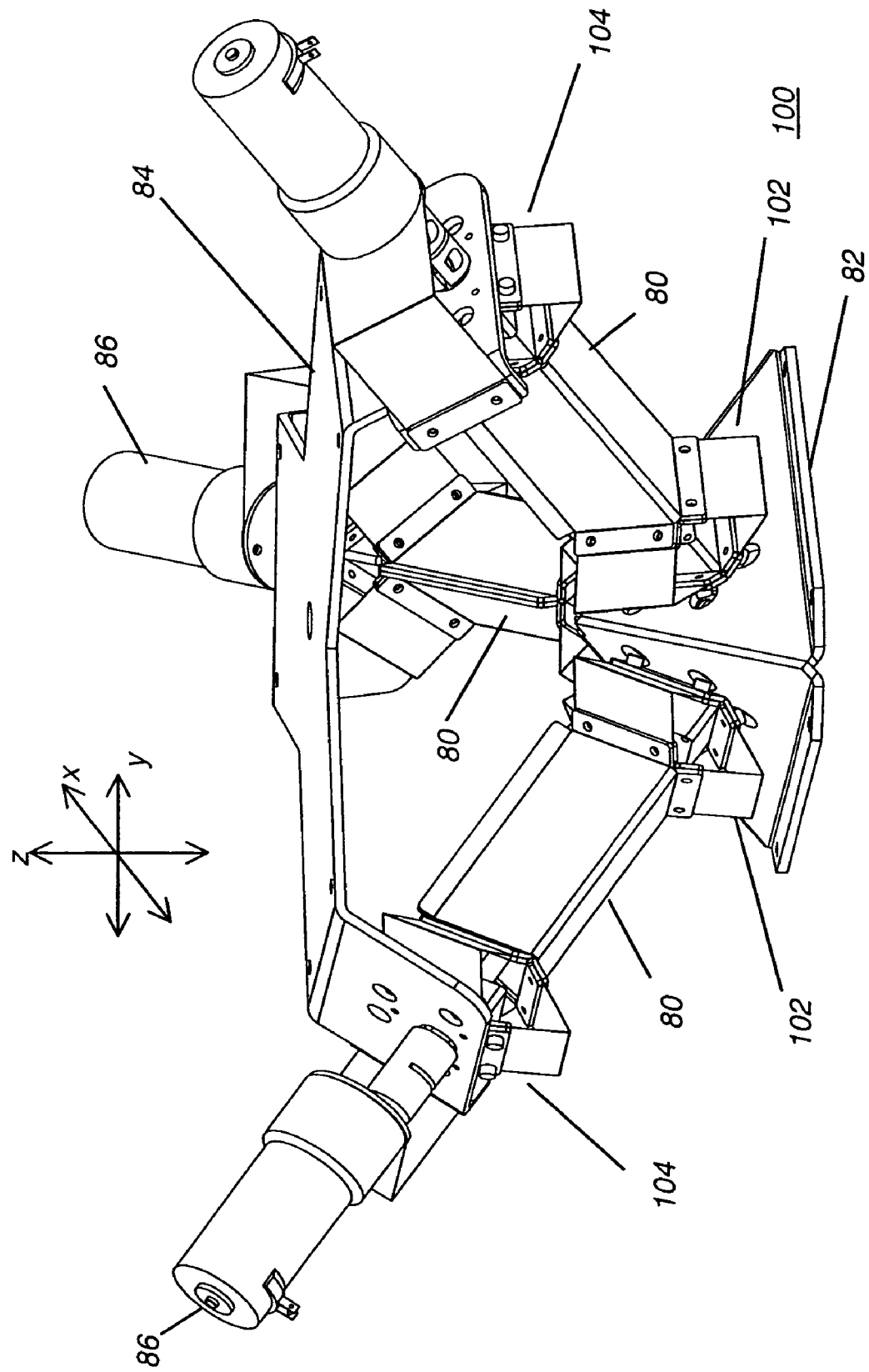

The apparatus of the present invention adapts a novel type of shaft coupling as a solution for multi-axis positioning. Referring to FIG. 12, there is shown a perspective view of a multi-axis positioning apparatus 100 according to the present invention. Multi-axis positioning apparatus 100 positions a platform 84 relative to a base 82, in 3-dimensional Cartesian coordinate space, as shown by the xyz axes in FIG. 12. Three flexible shaft couplings 80 are arranged as mutually orthogonal struts extending between platform 84 and base 82. Each flexible shaft coupling 80 has a motor 86 that controls the length of flexible shaft coupling 80 and thus controls the xyz position of platform 84.

Figure 2:
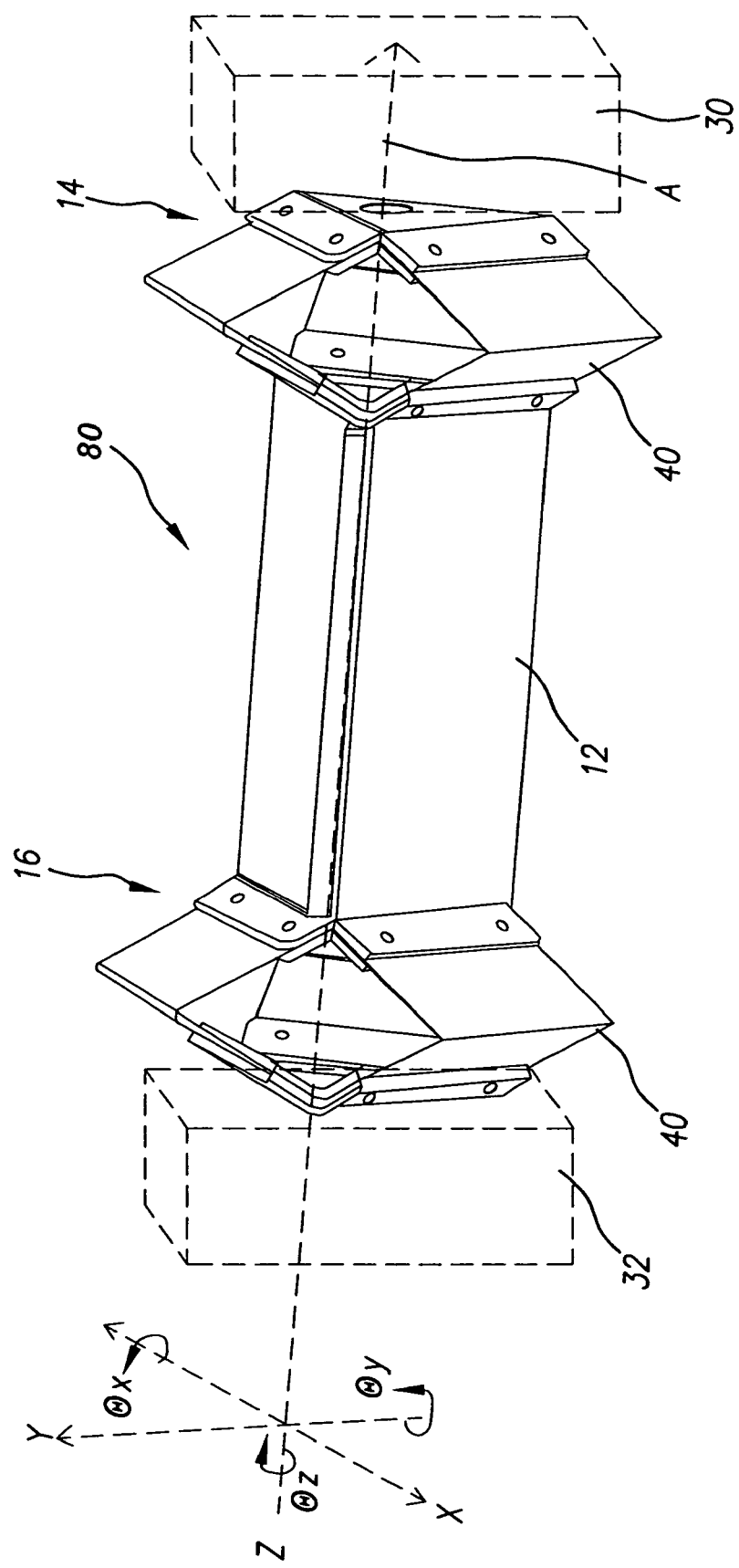
FIG. 2 is a perspective view showing a coupling apparatus used in one embodiment of the present invention.

In order to better understand how multi-axis positioning apparatus 100 operates, it is first useful to understand the structure of each flexible shaft coupling 80. Referring to FIG. 2, there is shown a perspective view of a flexible shaft coupling 80 according to one embodiment of the present invention. As was described in general with reference to the simplified schematic representation of FIG. 1, flexible shaft coupling 80 couples load member 32 to drive member 30. In the specific embodiments of multi-axis positioning apparatus 100 as shown in FIG. 12, drive and load members 30 and 32 correspond to either base 84 or platform 84. However, for the sake of this initial, more generalized description, the terms "load member" and "drive member" may be used.

Flexible shaft coupling 80 has a drive member coupling 14 and a load member coupling 16. Each drive and load member coupling 14 and 16 has the mechanical arrangement of flexure coupling 40, as described in more detail subsequently. Between drive member coupling 14 and load member coupling 16 is a rigid intermediate member 12, typically a shaft as shown in FIG. 2. In the job of coupling load member 32 to drive member 30, flexible shaft coupling 80 allows five degrees of freedom (x, y, z, θx, and θy) and is rigid in θz.

Figure 3:
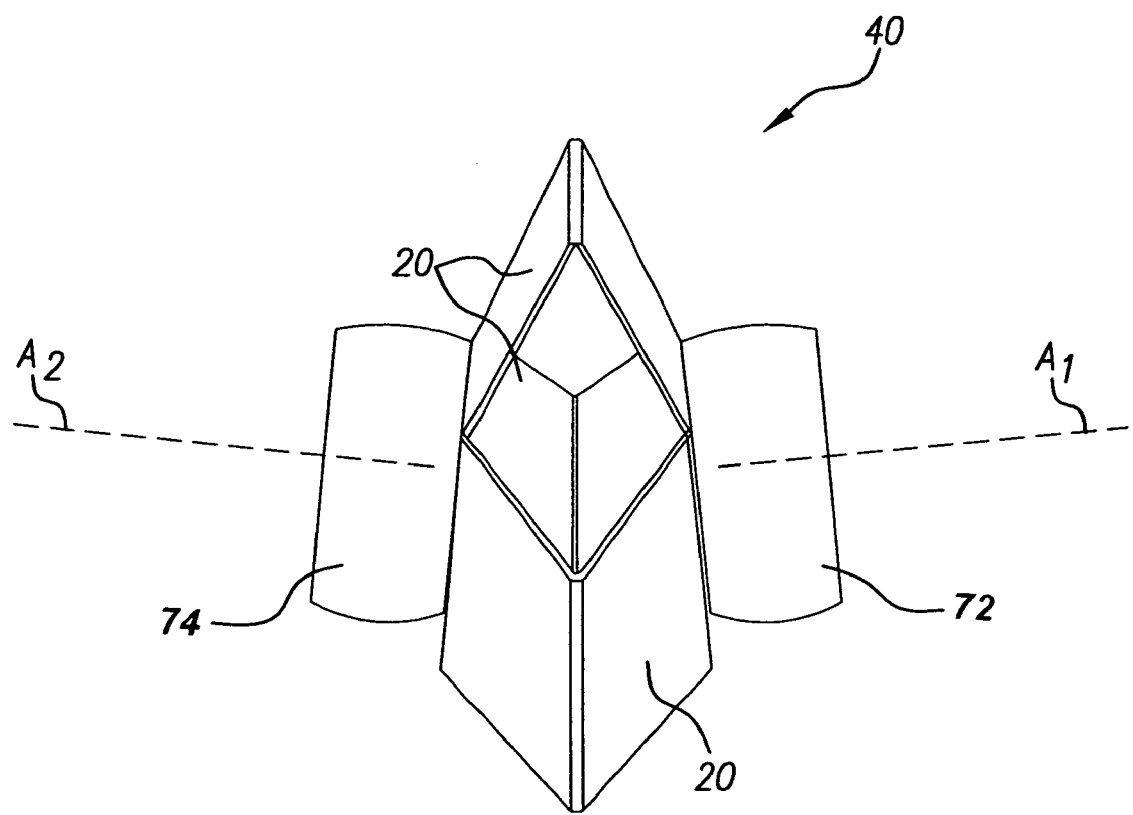
FIG. 3 is a perspective view of a flexure coupling in one embodiment.

Each drive and load member coupling 14 and 16 is similarly configured as coupling 40, shown in the perspective view of FIG. 3, according to one embodiment of the present invention. Flexure Coupling 40 has a number of folded sheet flexures 20 for mechanical attachment between a first member 72 and a second member 74. In the embodiments shown in FIGS. 2, 3, and following, each flexure coupling 40 employs three folded sheet flexures 20; this arrangement, using a minimum number of folded sheet flexures 20 symmetrically arranged with respect to a central axis, has mechanical advantages, as can be appreciated to those skilled in the mechanical arts. Flexure Coupling 40 provides a suitable combination of constraints and degrees of freedom to operate where first and second axes $A_1$ and $A_2$ are not aligned in parallel, as shown in FIG. 3.

Referring to FIGS. 2 and 3, the terminology used in the present application can be clarified by considering the position of coupling 40 as part of flexible shaft coupling 80. When flexure coupling 40 of FIG. 3 is used as drive member coupling 14 in flexible shaft coupling 80 of FIG. 2, first member 72 corresponds to drive member 30; second member 74 corresponds to rigid intermediate member 12. When flexure coupling 40 of FIG. 3 is used as load member coupling 16 in flexible shaft coupling 80 of FIG. 2, first member 72 corresponds to rigid intermediate member 12; second member 74 corresponds to load member 32. As was noted in the background section above, the terms "drive" and "load" are used in the broadest possible sense, simply to distinguish one coupled member from another.

Figure 4:
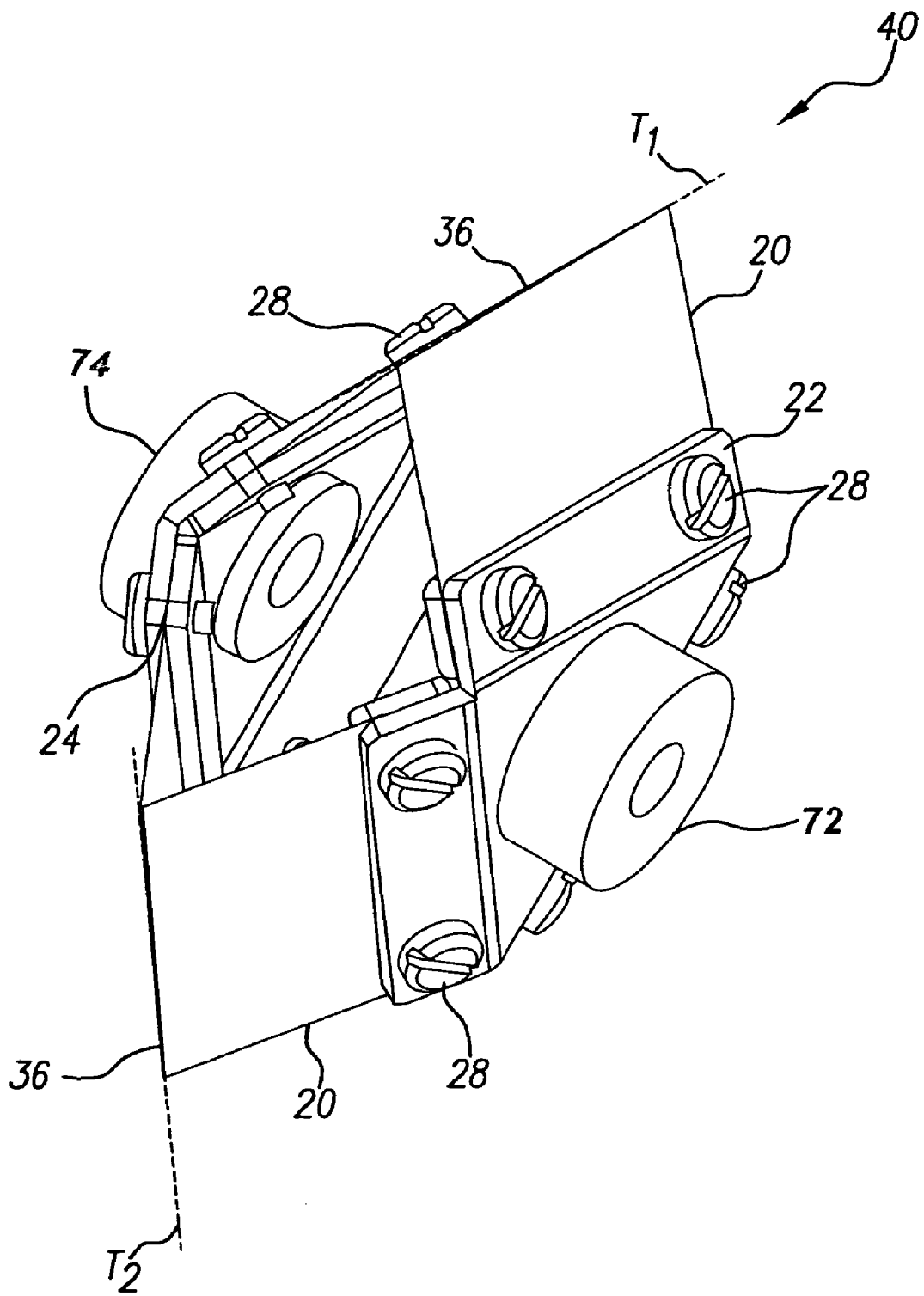
FIG. 4 is a perspective view of a flexure coupling showing key components and geometric relationships.

Referring to FIG. 4, the arrangement of flexure coupling 40 components in one embodiment is shown in more detail. For the configuration shown in FIG. 4, a plate 22, 24 is used on each side of coupling 40, fastened to each folded sheet flexure 20 by screws 28 or other suitable fasteners and using a flanged arrangement as shown. As can be readily appreciated by those skilled in the mechanical arts, any of a number of alternate components or methods could be employed for attachment of folded sheet flexure 20 in coupling 40 to first or second members 72 and 74. Possible alternate attachment means include welds or rivets, for example. In yet other embodiments, one or more folded sheet flexures 20 may simply be extended portions of surfaces of drive or load members 30 or 32 or of rigid intermediate member 12 and thus not require fasteners at one side or the other. A fold 36 is formed in each folded sheet flexure 20.

Flexure Coupling 40 Structure and Geometry

Figure 5:
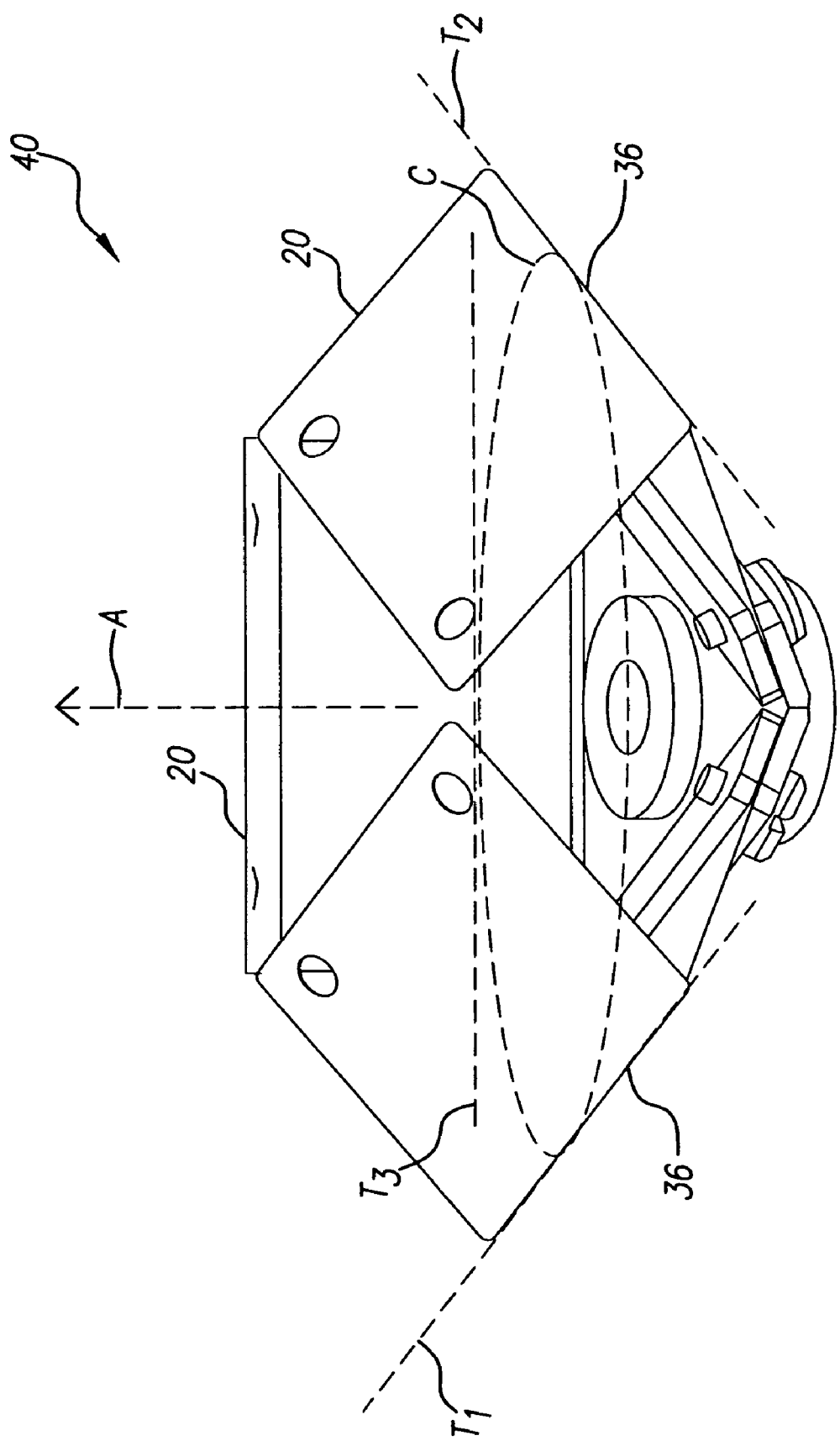
FIG. 5 is a perspective view of a flexure coupling showing key geometric relationships.
Figure 6:
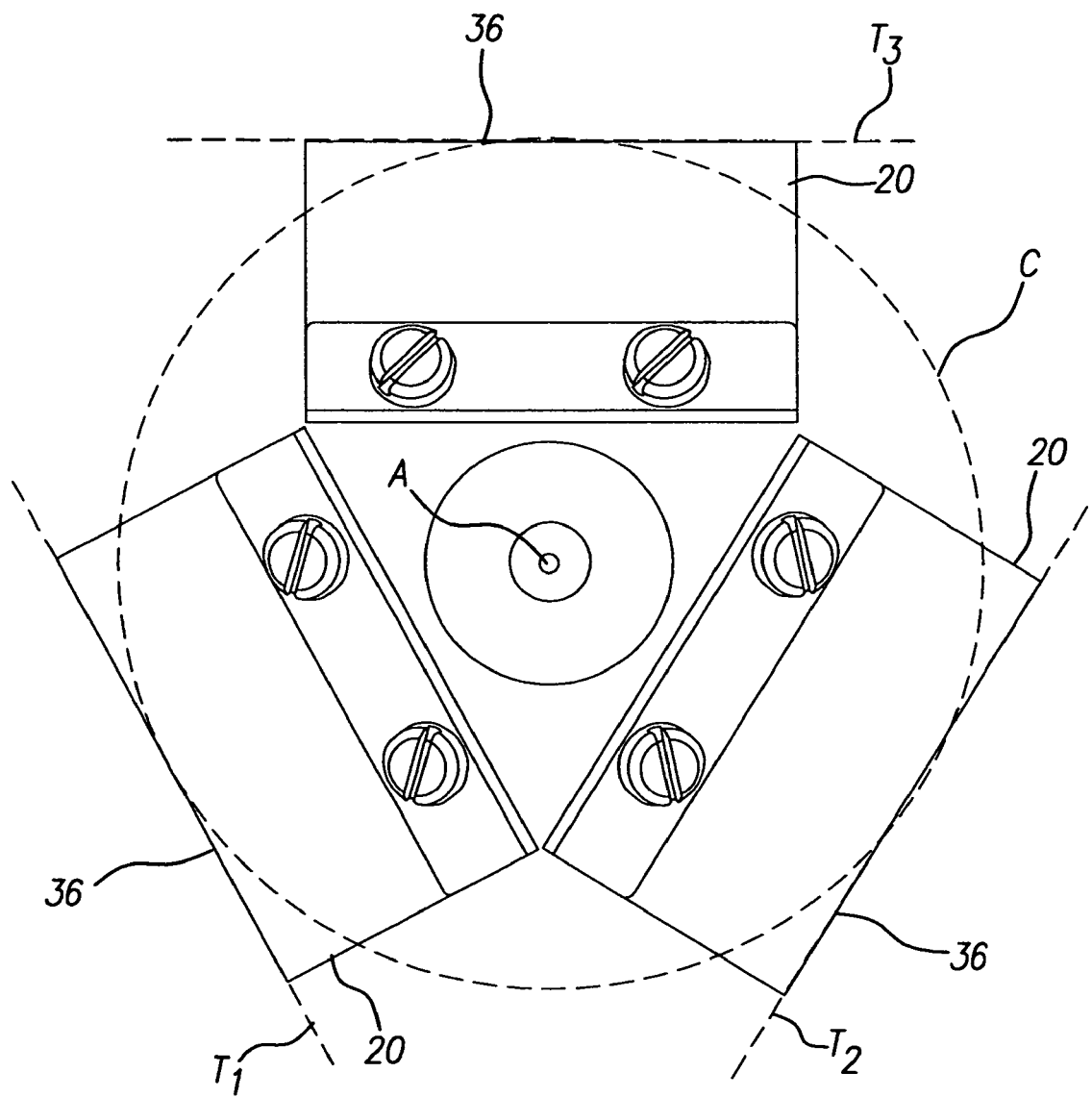
FIG. 6 is a front view of a flexure coupling showing key geometric relationships.
Figure 7:
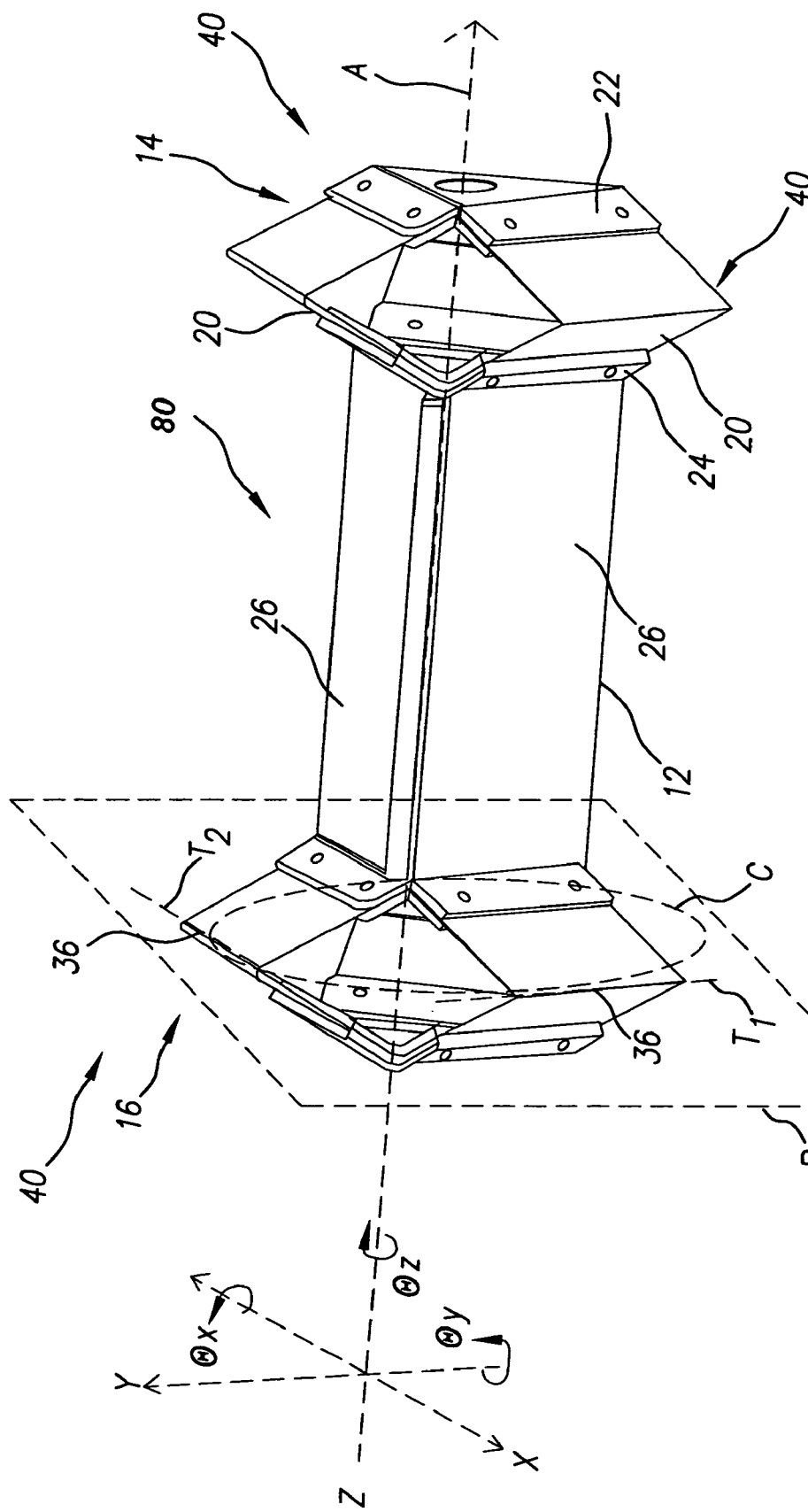
FIG. 7 is a perspective view of a coupling apparatus according to the present invention, related to conventional coordinate axes to illustrate degrees of freedom and constraint.
Figure 8A:
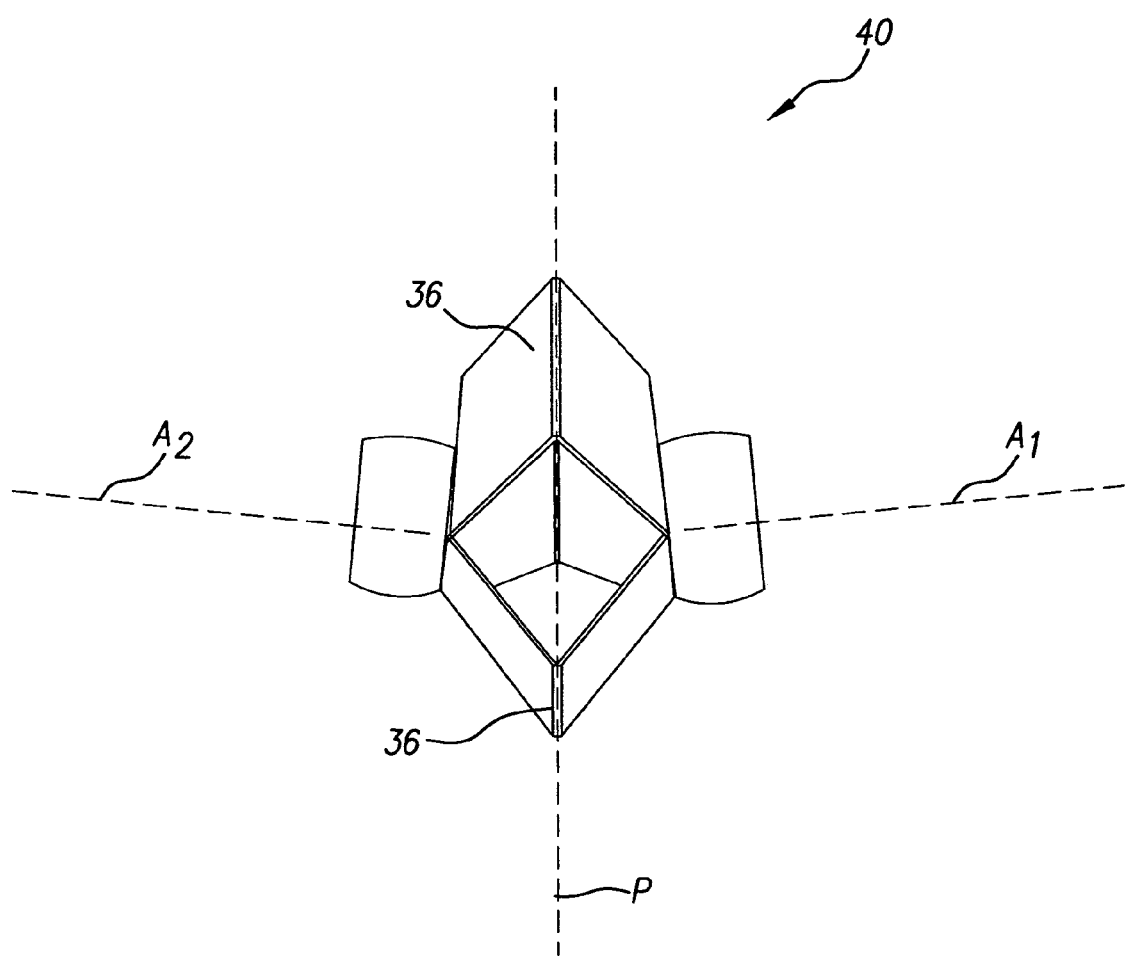
FIGS. 8A-8D are perspective views of a flexure coupling, showing rotation wherein load and drive axes are not aligned in parallel.
Figure 8B:
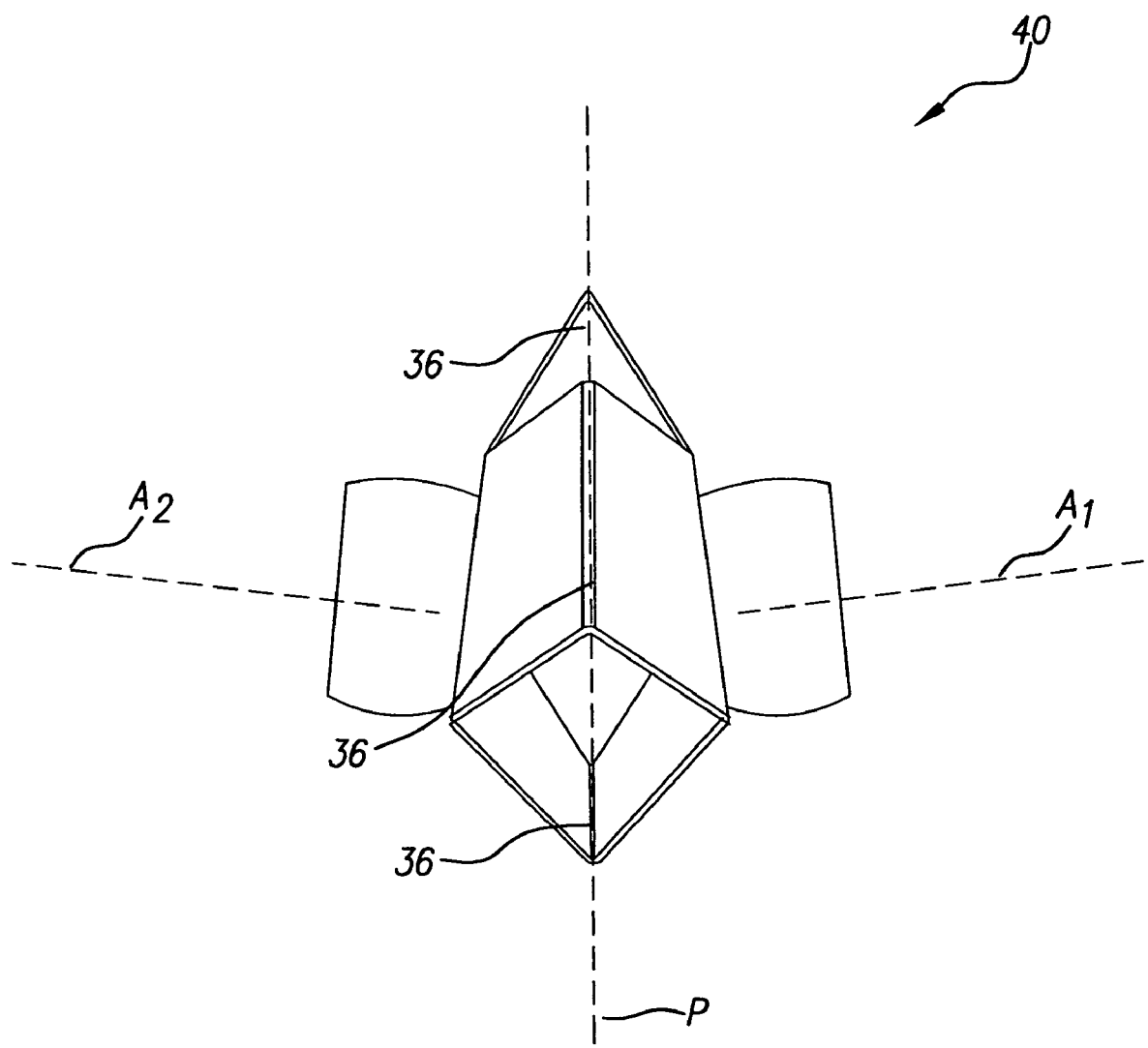
Figure 8C:
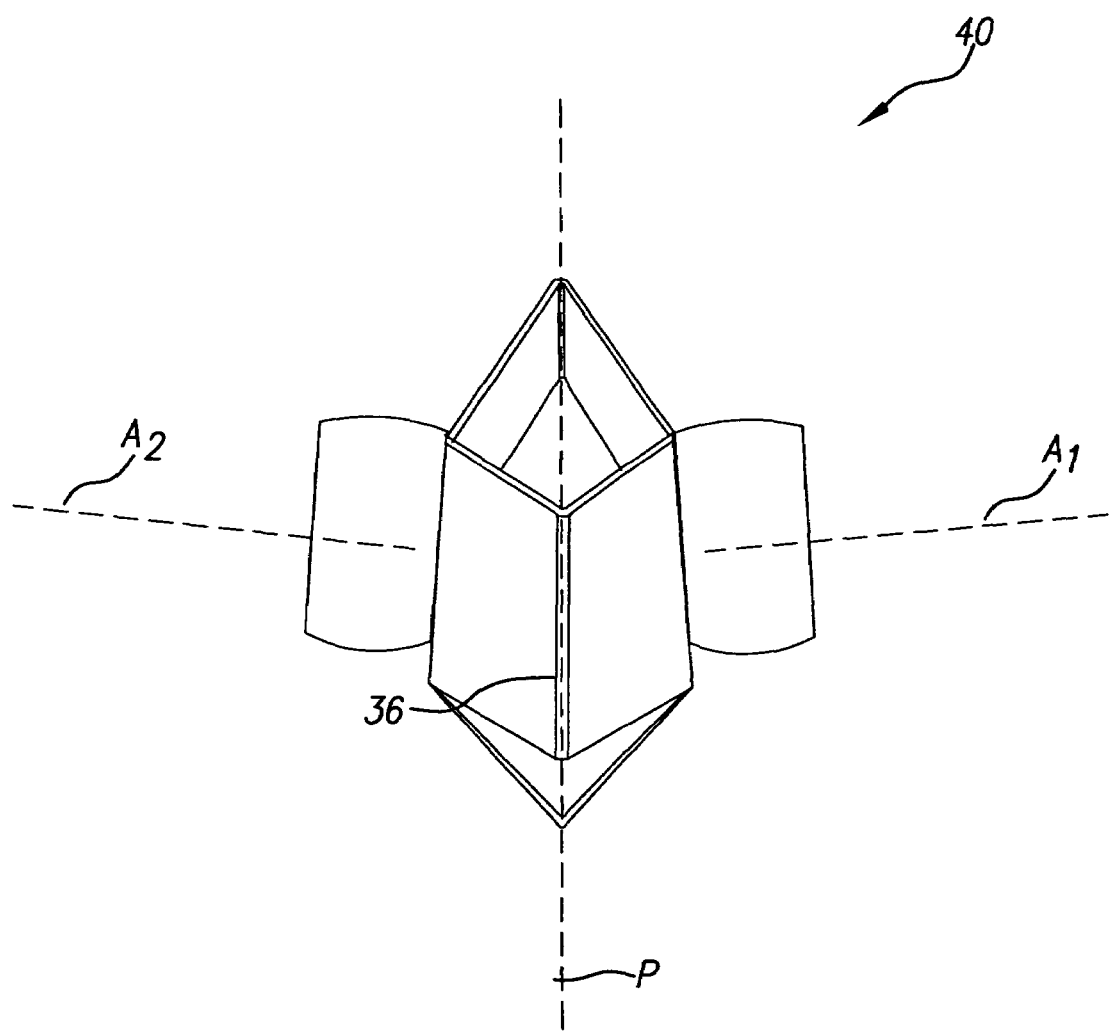
Figure 8D:
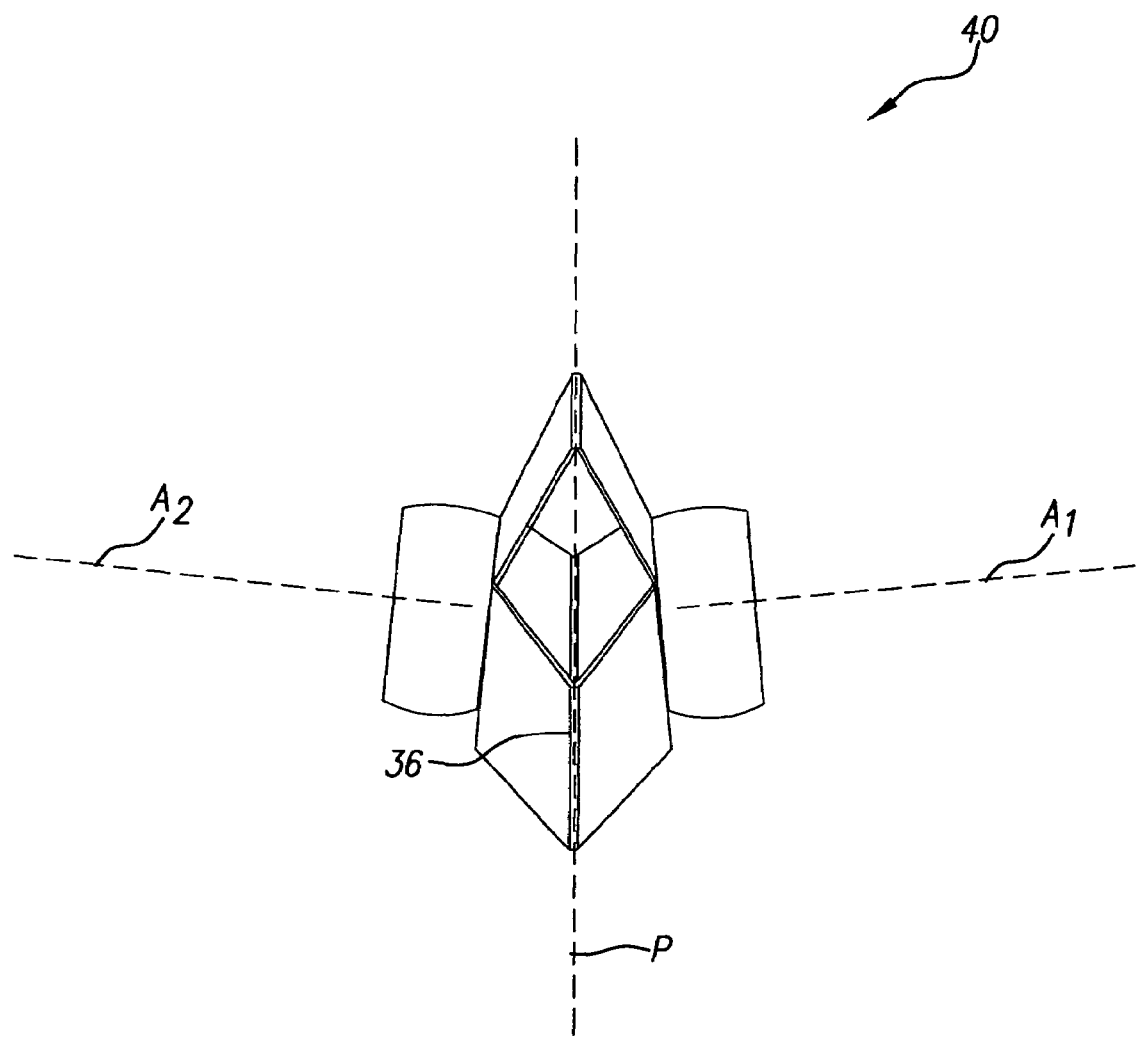

A detailed understanding of the structure and geometrical relationships of flexure coupling 40 used as a flexible shaft coupling 80 component helps to better grasp its usefulness and capabilities when deployed as drive member coupling 14 and as load member coupling 16. FIGS. 5, 6, and 7 show, from different views, the geometrical symmetry of folds 36 with respect to each other. The following observations can be made for flexure coupling 40:

(i) Folds 36 are coplanar, as is best represented in FIGS. 6 and 7, where the folds 36 are in a plane P;
(ii) Each fold 36 can be considered along a tangent line $T_1$, $T_2$, $T_3$ to a circle C, as is best shown in FIGS. 5 and 6, shown dotted;
(iii) Circle C is centered about an axis A between first and second members 72 and 74, extending generally in the direction of coordinate axis z in FIG. 7. Axis A can be considered the rotational axis corresponding to θz rotation; and
(iv) Plane P and circle C are orthogonal to axis A.

It must be emphasized once again that the preferred geometrical relationships described in (i) to (iv) above apply for each flexure coupling 40 used in flexible shaft coupling 80 of FIGS. 2 and 7, both when used as load member coupling 16 and when used as drive member coupling 14.

With each of its flexure couplings 40 given the geometrical arrangement described with reference to FIGS. 5 through 7 and summarized in (i) to (iv) above, flexible shaft coupling 80 provides the following, as represented in FIGS. 1 and 2:

(i) Constraint, with a high level of wind-up stiffness in θz;
(ii) Five degrees of freedom, or flexibility, specifically in x, y, z, θx, and θy.

As has been noted above, the configuration of flexure coupling 40 using three folded sheet flexures 20 is particularly advantaged. Significantly, because of the trilateral symmetry of folded sheet flexures 20, plane P (FIG. 7) for each flexure coupling 40 tends to align itself as the bisector of first and second axes $A_1$ and $A_2$ (FIG. 3). As each respective folded flexure coupling 40 rotates, its folds 36 remain coplanar in plane P, as is shown in the sequence of FIGS. 8A-8D. This occurs even when first and second axes $A_1$ and $A_2$ are angularly misaligned, as is shown in FIGS. 3, 8A, 8B, 8C, and 8D. This behavior gives coupling 40 its "constant velocity" characteristic, so that flexure coupling 40, when fabricated in accordance with the geometry outlined in items (i)-(iv) above, is itself a CV coupling. Flexible shaft coupling 80, having a CV coupling at each end of its rigid intermediate member 12, also has CV coupling characteristics.

Alternate Embodiments of Flexible Shaft Coupling 80

Rigid intermediate member 12 may have any of a number of forms. In the embodiments of FIGS. 2 and 7, rigid intermediate member 12 is a polygonal shaft having three surfaces 26. That is, rigid intermediate member 12 is a triangular cylinder. Surfaces 26 are preferably flat or substantially flat and are extended in the direction of rotational axis A in the embodiment of FIG. 7. Folded sheet flexures 20 can be attached to surfaces 26 using screws 28 driven into plate 24 or by other attachment means, such as welding or rivets, for example. In an alternate embodiment, one or more folded sheet flexures 20 are simply extended portions of surfaces 26, eliminating the need for plate 24 and screws 28 or for other attachment mechanisms at the end of rigid intermediate member 12. The opposite end of folded sheet flexure 20, opposite fold 36 from rigid intermediate member 12, has plate 22 for attachment to a drive or load component. As can be appreciated by those skilled in the mechanical arts, any of a number of alternate fastening components could be employed for attachment to the drive or load members 30, 32.

The fabrication of a polygonal shaft as rigid intermediate member 12 with three surfaces 26, as shown in FIGS. 2 and 7, is advantaged for simplicity and for providing an inherent structural rigidity, important for providing overall stiffness to flexible shaft coupling 80. Rigid intermediate member 12 can be fabricated into triangular cylindrical form, or into some other cylindrical form having four or more side surfaces 26, from a single piece of sheet metal or other rigid material. (It is instructive to observe that the mathematical definition of a cylinder includes not only the familiar right circular cylinder, but also any number of other shapes whose outer surface can be traced out by moving a straight line parallel to a fixed straight line, wherein the moving straight line intersects a fixed planar closed curve or base.) Rigid intermediate member 12 could also be fabricated as a right circular cylinder, with suitable surfaces formed at the ends of the cylinder to allow attachment of folded sheet flexures 20 thereon. Or, other connecting hardware could be used to attach folded sheet flexures 20 to rigid intermediate member 12 when fabricated as a right circular cylinder. In addition, other arrangements using solid structures for rigid intermediate member 12 could be used.

Figure 9:
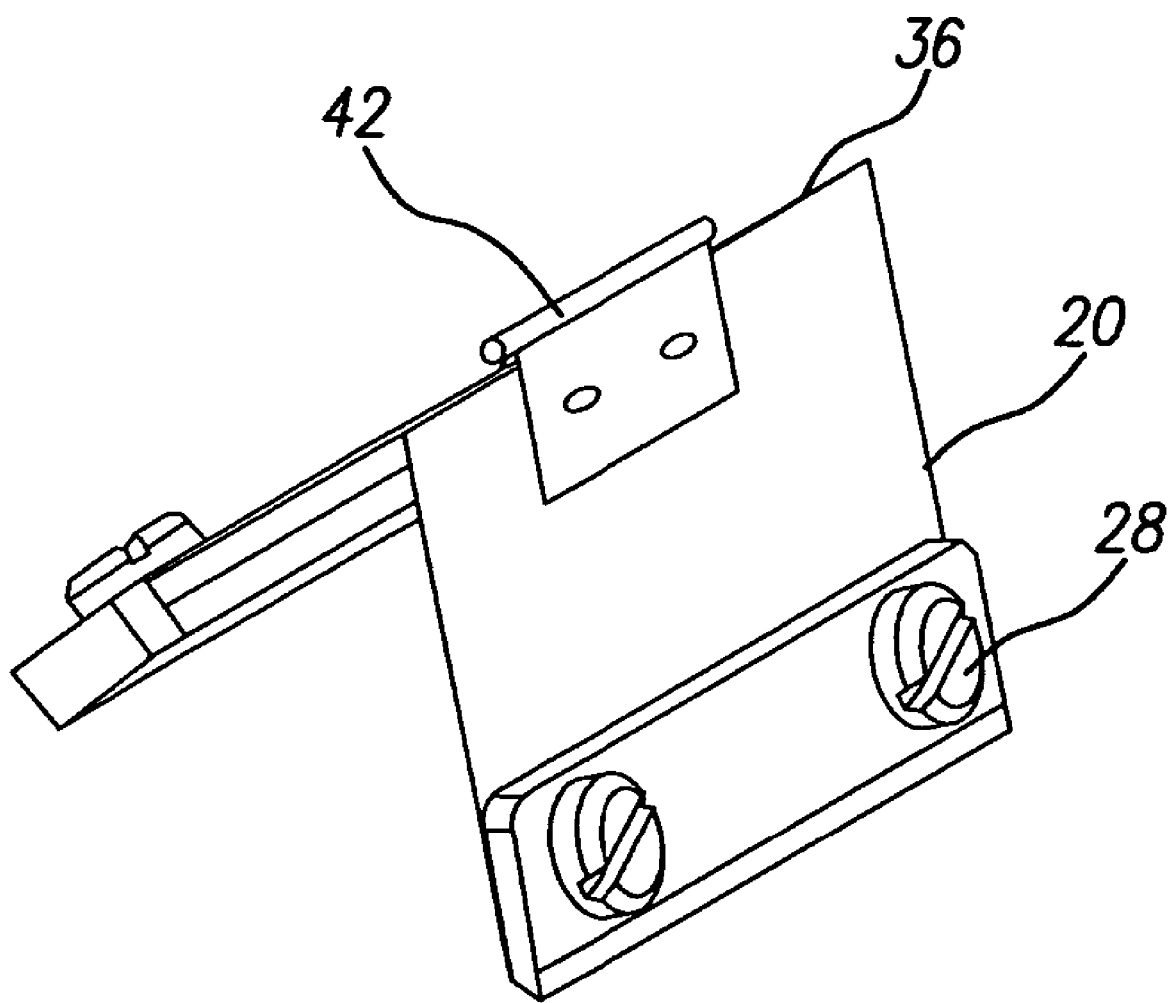
FIG. 9 is a perspective view showing an alternate embodiment for the flexure coupling of the present invention.

Folded sheet flexures 20 in FIGS. 2-8D are shown formed from a single sheet, typically of spring steel, creased at fold 36. However, alternate embodiments for folded sheet flexures 20 are possible and may be preferable for some applications. For example, two individual sheets of metal, plastic, or other sheet material could be joined, using adhesives, hardware, welds, or other fastening methods, effectively forming fold 36 at their juncture. Alternately, a hardware component such as a hinge 42 could be used for forming fold 36 in folded sheet flexure 20, as is shown in FIG. 9. Relative to other configurations of flexure coupling 40 shown in FIGS. 2-8D in which each folded sheet flexure 20 is formed from a single sheet creased along fold 36, this hinged arrangement might provide more backlash, however. Additional support fasteners would also be required for an arrangement such as that shown in FIG. 9.

Figure 10:
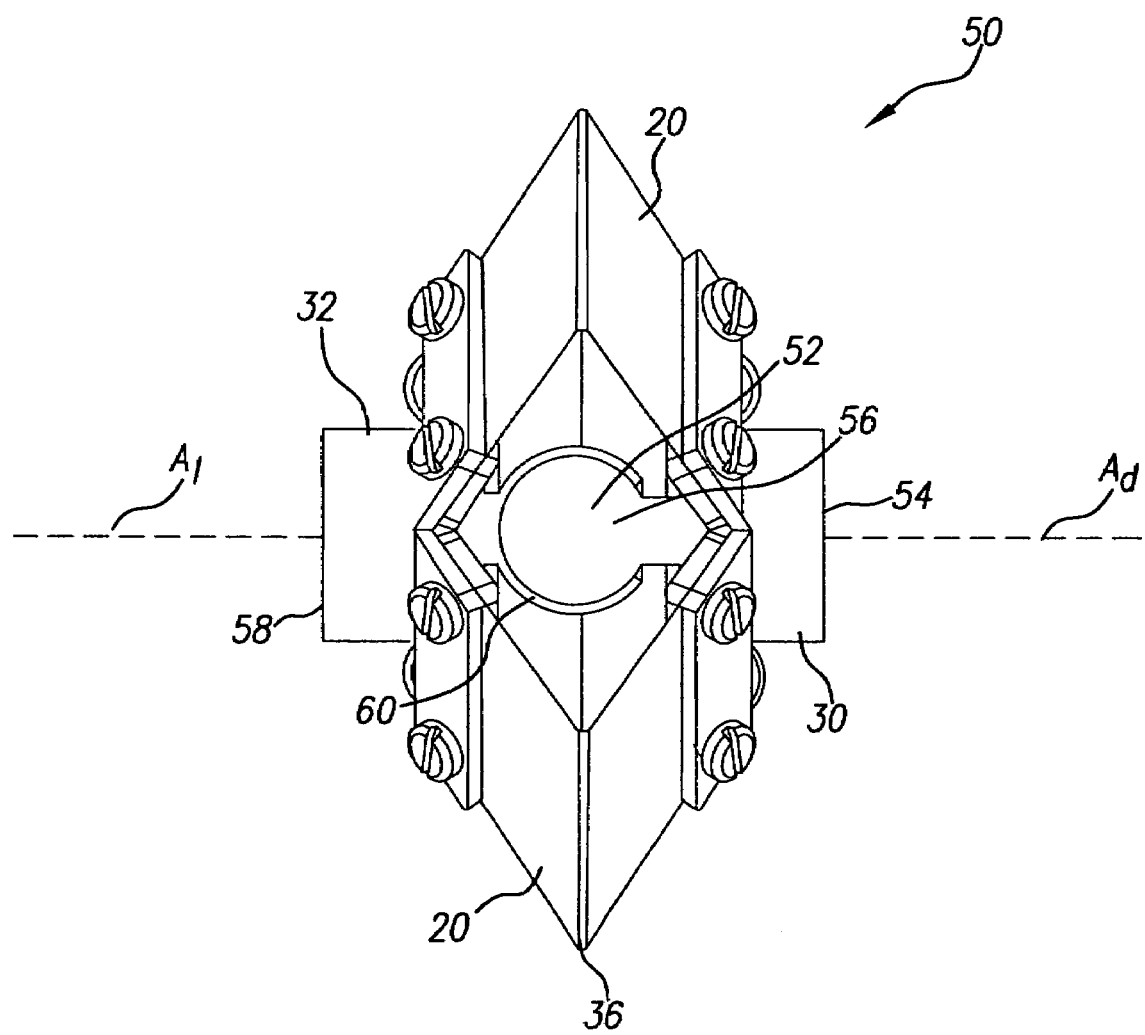
FIG. 10 is a perspective view showing another alternate embodiment of a flexure coupling according to the present invention.

In some embodiments, there may be a need to constrain movement of flexure coupling 40 in specific directions. For example, FIG. 10 shows a folded, axially constrained flexure coupling 50 having an additional captive ball-and-socket joint 52 that constrains axial movement of flexure coupling 50 between respective drive and load members 30 and 32 to handle compressive and tensile forces, but still provides good wind-up stiffness. For the specific example of FIG. 10, a drive hub 54 is coupled to a ball member 56; a load hub 58 has a complementary socket member 60. With constraint from captive ball-and-socket joint 52, folded flexure coupling 50 would, by itself, provide the same two degrees of freedom as a conventional Cardan coupling. However, folded flexure coupling 50 would provide superior performance due to its constant-velocity and zero backlash characteristics. In terms of function, for embodiments of the present invention, folded, axially constrained flexure coupling 50 of FIG. 10 and flexure coupling 40 of FIG. 4 can be considered to be interchangeable. That is, flexible shaft coupling 80 could be configured with either flexure coupling 50 or flexure coupling 40 as either drive member coupling 14 or as load member coupling 16.

For maximum wind-up stiffness and long life, folded sheet flexures 20 themselves are typically made of sheet metal, such as spring steel. Folded sheet flexures 20, although shown and described hereinabove as formed from flat sheets of metal or other material, may be fabricated in a number of alternate forms and could be patterned in a number of ways. Other types of sheet materials that are stiff to forces along the plane of the sheet material but flexible to forces orthogonal to the plane of the sheet material could be used. A skeletal structure could even be formed to provide the function of folded sheet flexures 20 without using flat sheets.

Figure 11:
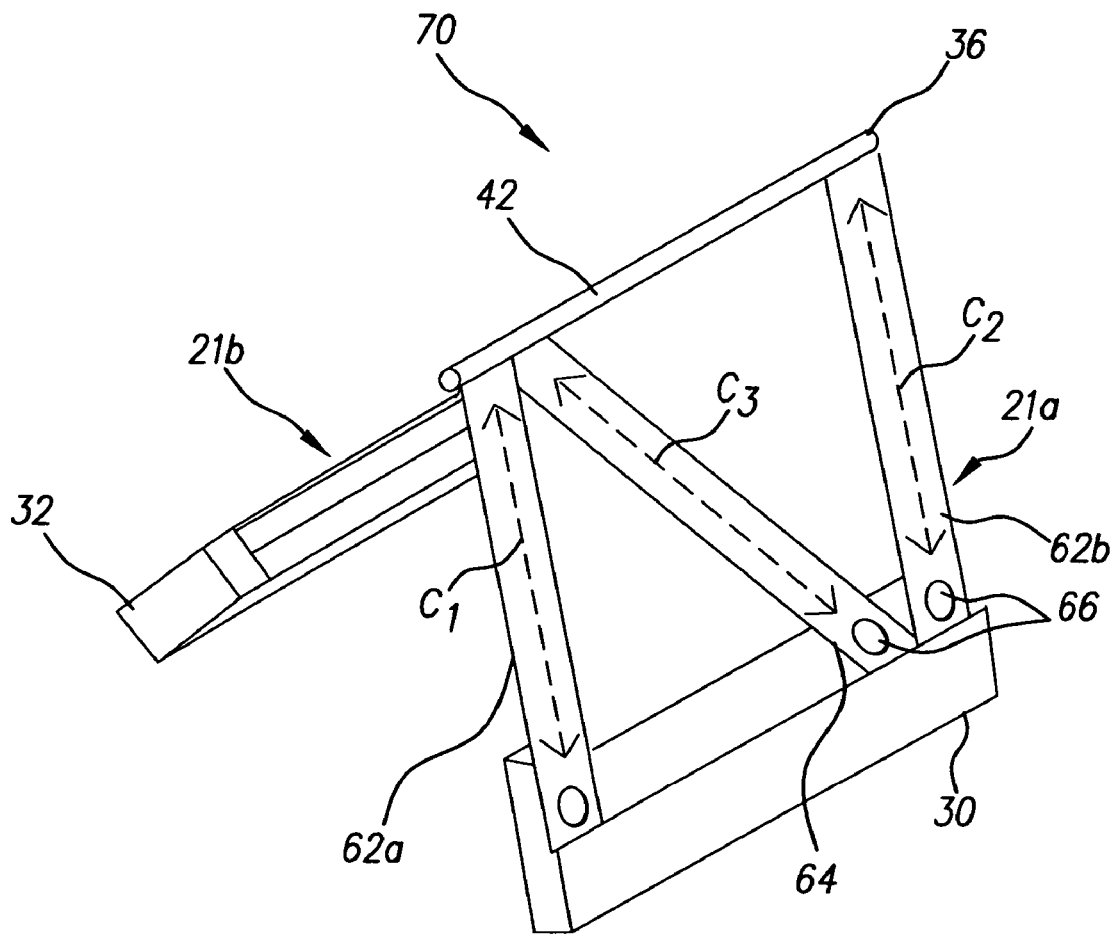
FIG. 11 is a perspective view showing an alternate embodiment for the flexure coupling of the present invention; and, FIG. 12 is a perspective view showing a positioning apparatus in one embodiment of the present invention.

A general discussion of sheet flexure behavior, characteristics, and design is given in *Exact Constraint: Machine Design Using Kinematic Principles* by Douglass L. Blanding, ASME Press, New York, N.Y., 1999, pp. 62-68. From this reference, the general concept of a "sheet flexure equivalent" can be inferred by one skilled in the mechanical arts. For example, a "planar" flexure that exhibits behavior that is equivalent to that of a sheet flexure can be formed using a skeletal arrangement of linearly elongated members, such as thin bars or wires extended between two surfaces or other support members. For such an arrangement, two bars or wires would extend between the two surfaces or support members, with the bars or wires generally parallel to each other, thereby defining a plane. A third bar or wire would be in the same plane as the other two bars or wires, but would be diagonally disposed relative to the two parallel bars or wires. In the notation used in the Blanding text cited above, a sheet flexure equivalent would have two parallel constraints $C_1$, $C_2$ that define a plane and a third constraint $C_3$ that is in the same plane and is at a diagonal with respect to parallel constraints $C_1$, and $C_2$. As is shown in the perspective view of FIG. 11, a coupling using these equivalent structures would have a plurality of hinged two-sheet flexure equivalent members 70. Each two-sheet flexure equivalent member 70 has a first sheet equivalent structure 21a that extends between drive member 30 and fold 36 and a second sheet equivalent structure 21b that extends between load member 32 and fold 36. At fold 36 may be a hinge 42, as shown, a bar, or some other type of junction member. Each sheet equivalent structure 21a, 21b has at least two parallel, linearly elongated members 62a and 62b that extend from hinge 42 to drive or load member 30 or 32 respectively. In the same plane as that defined by parallel, linearly elongated members 62a and 62b is a third linearly elongated member 64, disposed generally at a diagonal with respect to parallel, linearly elongated members 62a and 62b. Linearly elongated members 62a, 62b, 64 may be wires or bars, for example, depending on size, weight, and rigidity requirements. As shown in FIG. 11, following the convention used in the Blanding text noted above, linearly elongated members 62a, 62b, 64 provide the corresponding linear constraints $C_1$, $C_2$ and $C_3$. Fasteners 66 are used for attaching two-sheet flexure equivalent members 70 at both drive and load members 30 and 32. A drawback with such an arrangement would be the need for additional fastening hardware and for some type of hinge 42 if used. However, useful embodiments using flexure coupling 40 with various types of sheet equivalent structures 21a, 21b can be envisioned.

Any of numerous arrangements of attachment hardware could be used at either end of folded sheet flexure 20, with any of a number of configurations of plates, fixtures, mounting components and fasteners, and bonding methods, for example.

Arrangement of Multi-axis Positioning Apparatus 100

Figure 13:
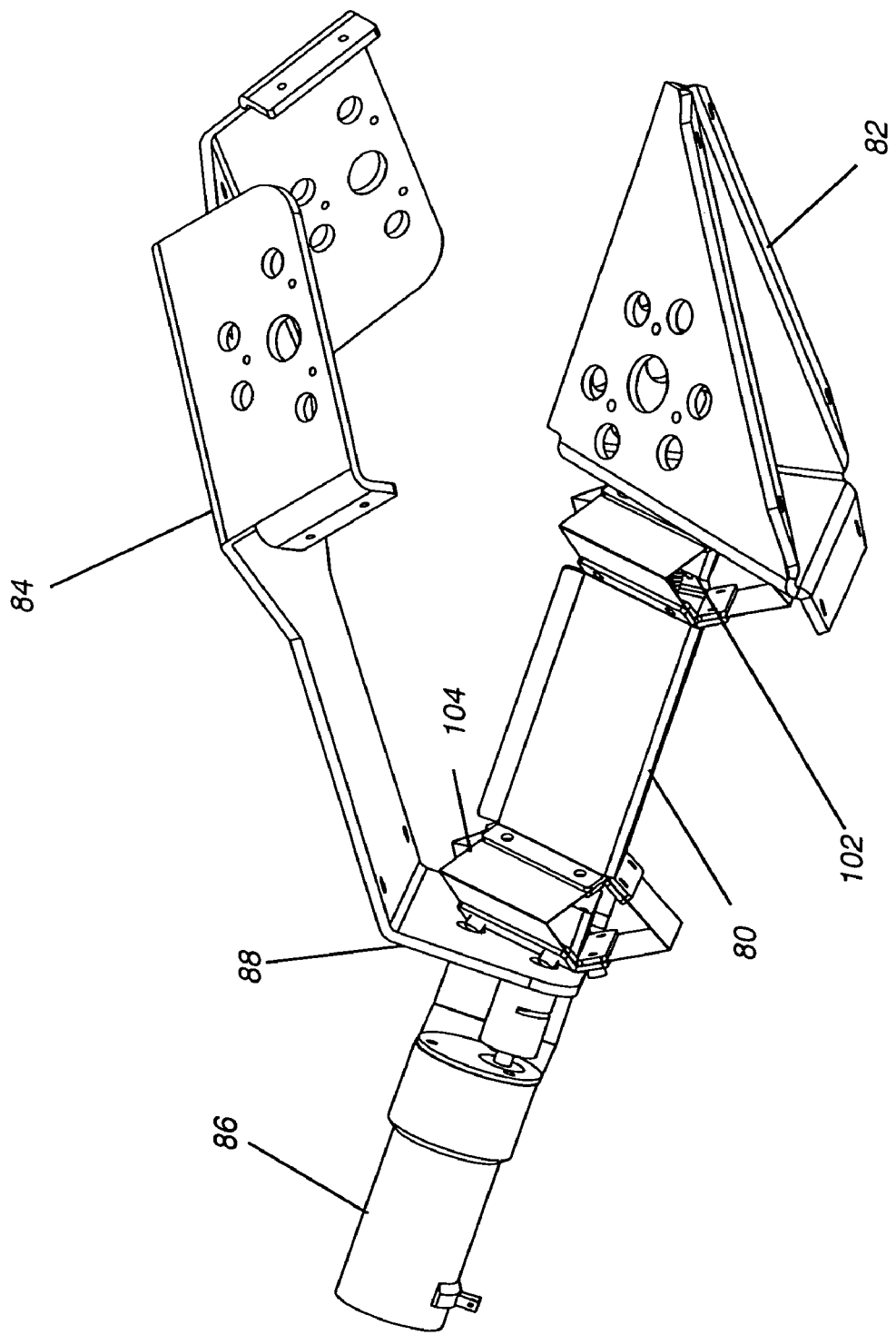
FIG. 13 is a perspective view of a single assembled shaft coupling used in the apparatus of the present invention.
Figure 14:
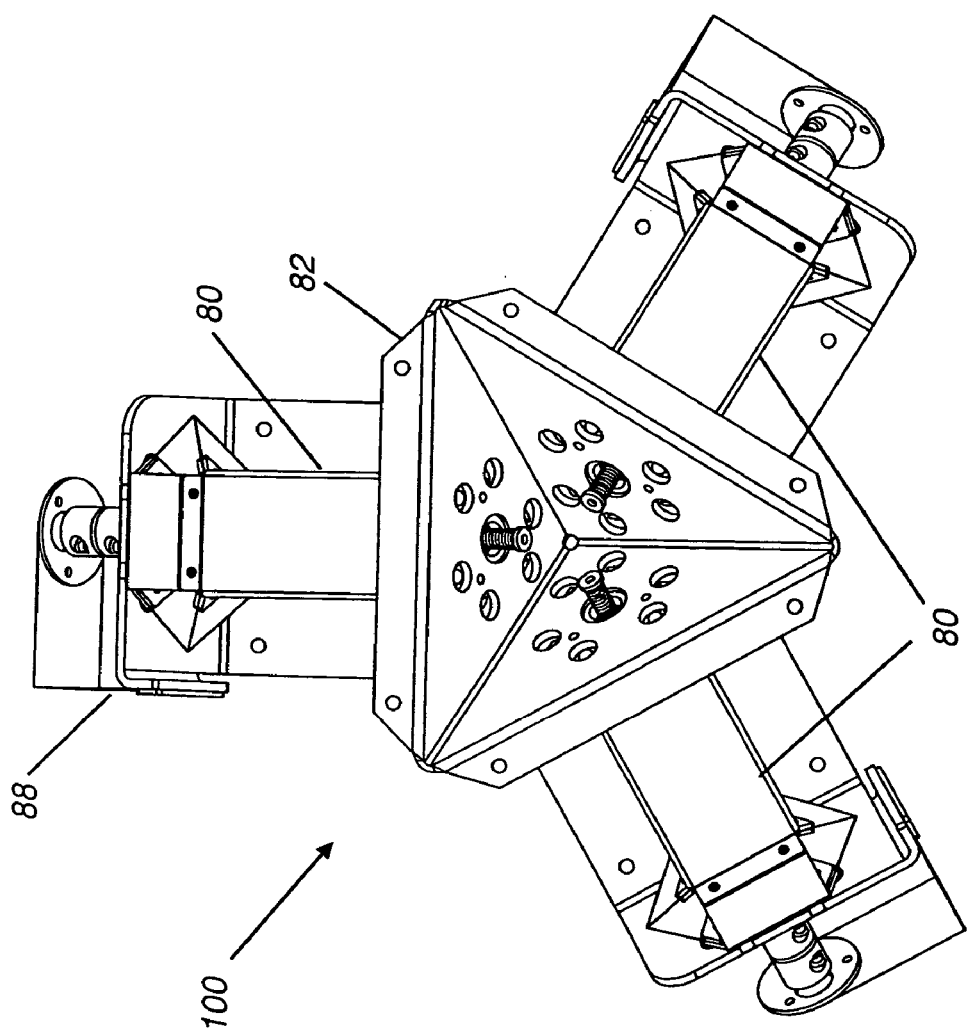
FIG. 14 is a view from the base of a positioning apparatus in one embodiment of the present invention.
Figure 15:
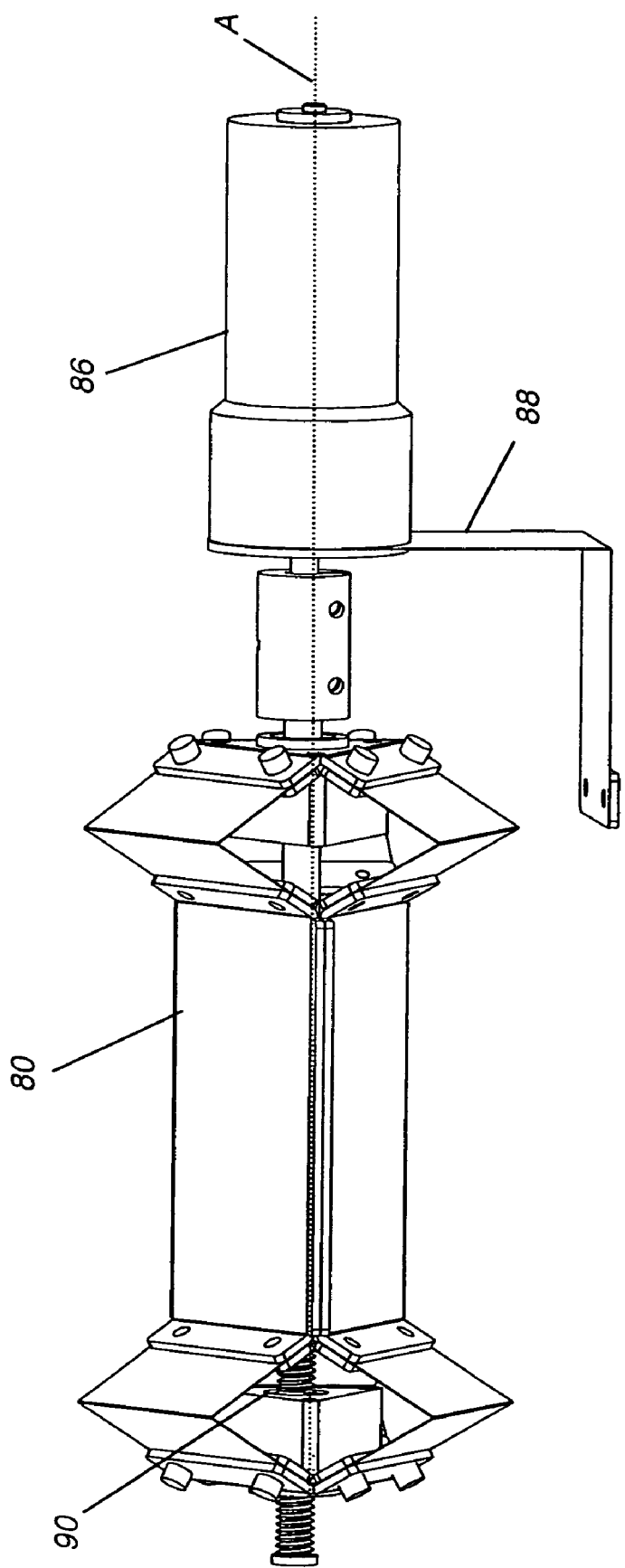
FIG. 15 is a side view showing a flexible shaft coupling as used in the present invention.
Figure 16:
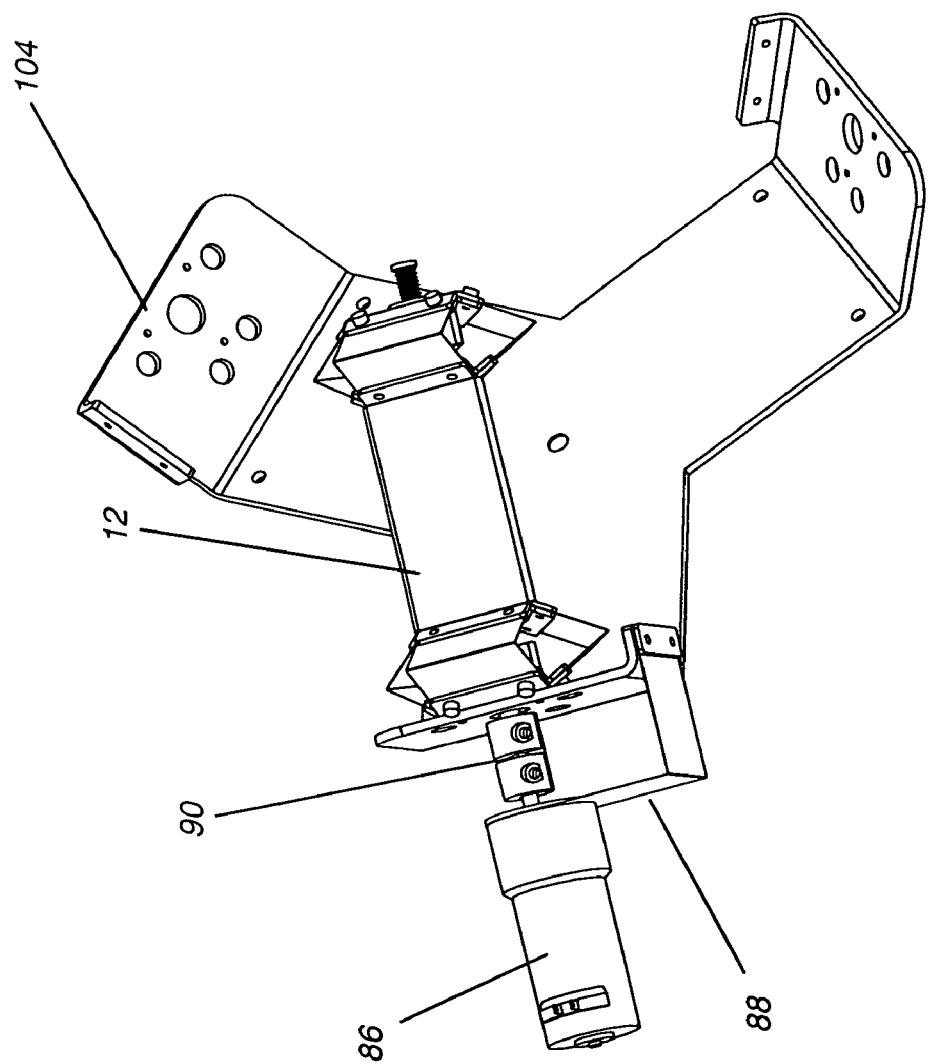
FIG. 16 is a perspective view showing a motor used for driving a shaft within the flexible shaft coupling of the present invention.
Figure 17:
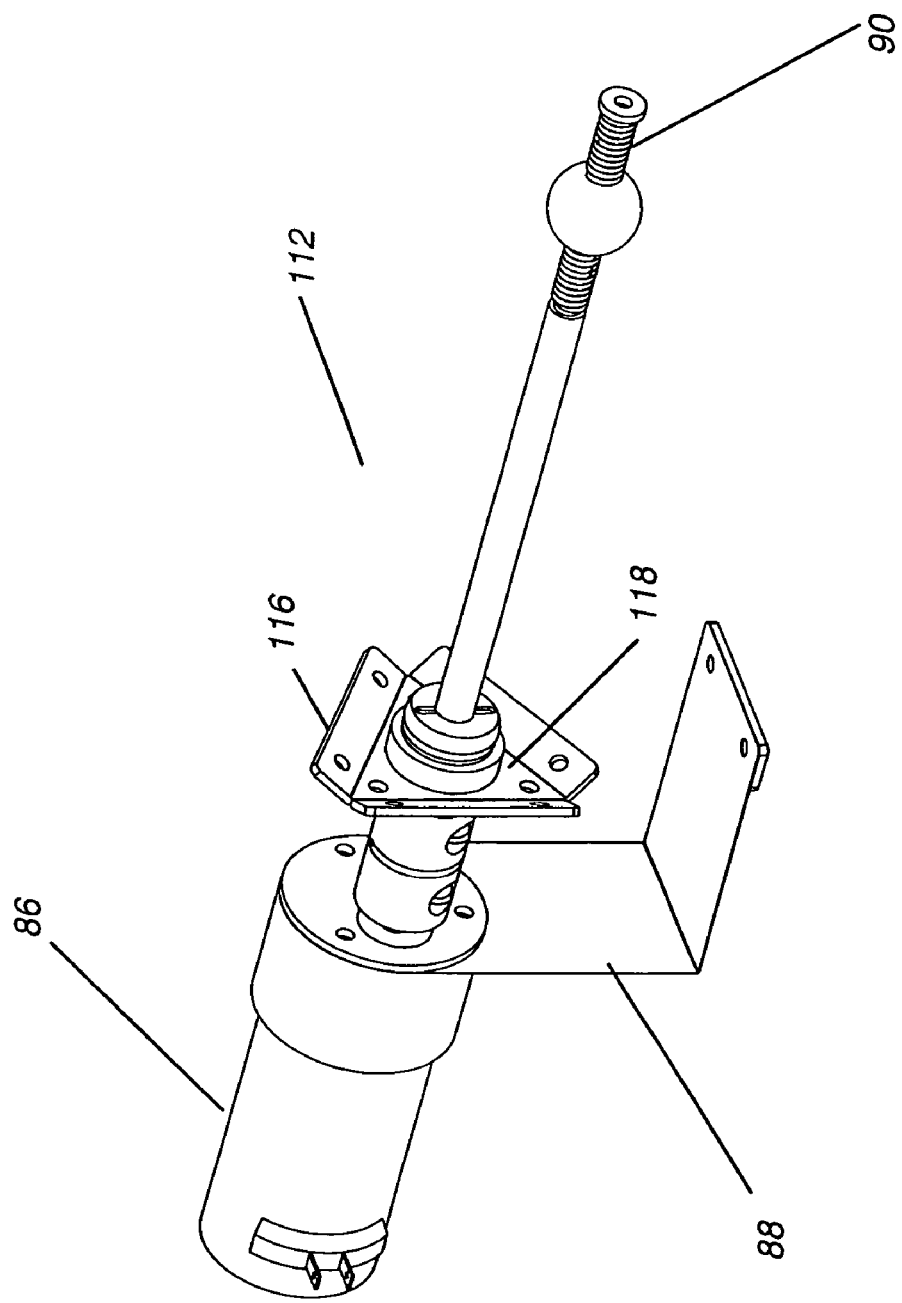
FIG. 17 is a perspective view of the motor and shaft, with the flexible shaft coupling components removed.
Figure 18:
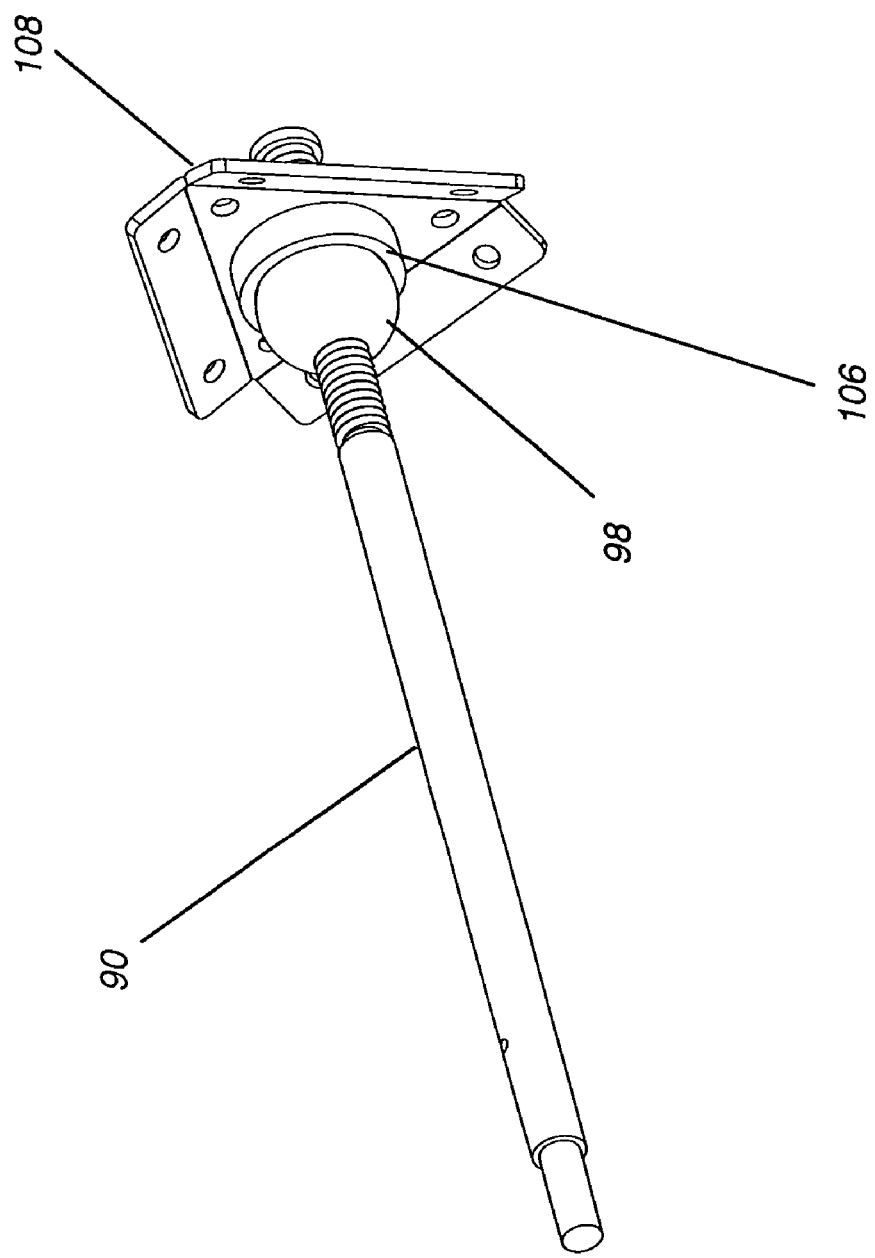
FIG. 18 is a perspective view of one end of the shaft, with the flexible shaft coupling components removed.

Given the above detailed description of flexible shaft coupling 80, the operation of multi-axis positioning apparatus 100 can now be more fully explained. Referring again to FIG. 12, each flexible shaft coupling 80 has a base coupling 102 that is coupled to base 82 and a platform coupling 104 that is coupled to platform 84. The partially assembled view of FIG. 13 shows, in a perspective view from base 82, how each flexible shaft coupling 80 mounts between base 82 and platform 84. FIG. 14 shows an embodiment with three flexible shaft couplings 80 mounted to base 82 at substantially equal angles (120 degrees) relative to the plane of base 82 and mutually orthogonal to each other. This tripod arrangement is advantageous for providing stable support, as is apparent to those skilled in the positioning arts.

As was described with respect to FIG. 7, flexible shaft coupling 80 has some freedom of movement in the z direction, along its central axis A. This advantageously enables flexible shaft coupling 80 to extend somewhat to a desired length, within a range.

Figure 19:
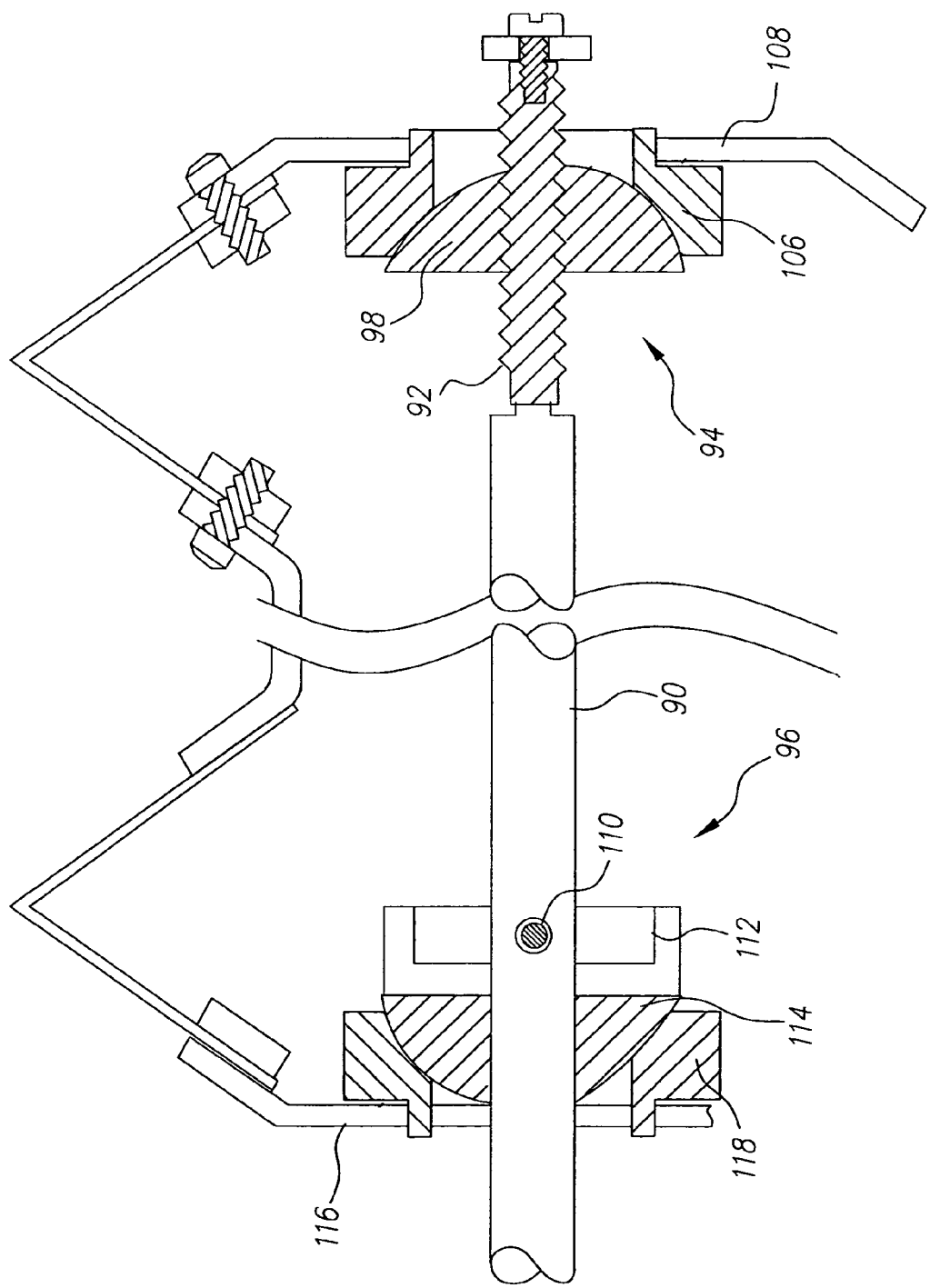
FIG. 19 is a cross-sectional view showing components for adjusting the length of the flexible shaft coupling of the present invention.

For use in a positioning apparatus, some type of translational actuator(s) must be provided. A translational actuator may be external to flexible shaft coupling 80, as described in more detail subsequently, or may be internal. An internal translational actuator would operate by changing the axial extension of flexible shaft coupling 80, effectively lengthening or shortening flexible shaft coupling 80 along its axis A, as shown in FIGS. 2 and 7. For the internally configured translational actuator shown in the embodiment of FIGS. 13, 16, 17, and 19, motor 86, held by a bracket 88, rotates a shaft 90 that runs through axis A of flexible shaft coupling 80. Shaft 90 has a threaded portion 92 at one end, threaded through a fitting 94 within flexible shaft coupling 80. At the opposite end of flexible shaft coupling 80, shaft 90 has a thrust bearing connection 96. In the embodiment shown in FIG. 19, fitting 94 uses a threaded spherical half-nut 98 that is mounted inside a socket 106 that is mounted on an end-plate 108. Thrust bearing connection 96 has a pin 110 that constrains shaft 90 against a cup 112 and bearing 114. An end-plate 116 secures a socket 118 at this section of shaft 90. The arrangement of FIG. 19 provides sufficient swivel at both ends to prevent or limit binding that could otherwise occur. Certainly, other arrangements for assembling shaft 90 as part of flexible shaft coupling 80 could also be implemented, as would be apparent to one skilled in the mechanical arts. In addition to the lead screw type shown in the embodiment of FIG. 19, other types of translational actuators could be employed for adjusting the axial extension, including hydraulic or piezoelectric actuators, cables, voice coils, and solenoids, for example. A manual translation actuator, such as a rotationally adjusted screw for example, could also be used. One advantage of flexible shaft coupling 80 when fabricated using folded sheet flexures 20 is its range of movement in the axial direction. Other types of flexures, such as those described in the Hall 1985 disclosure, have limited range in this direction.

Alternative Embodiment

Figure 20:
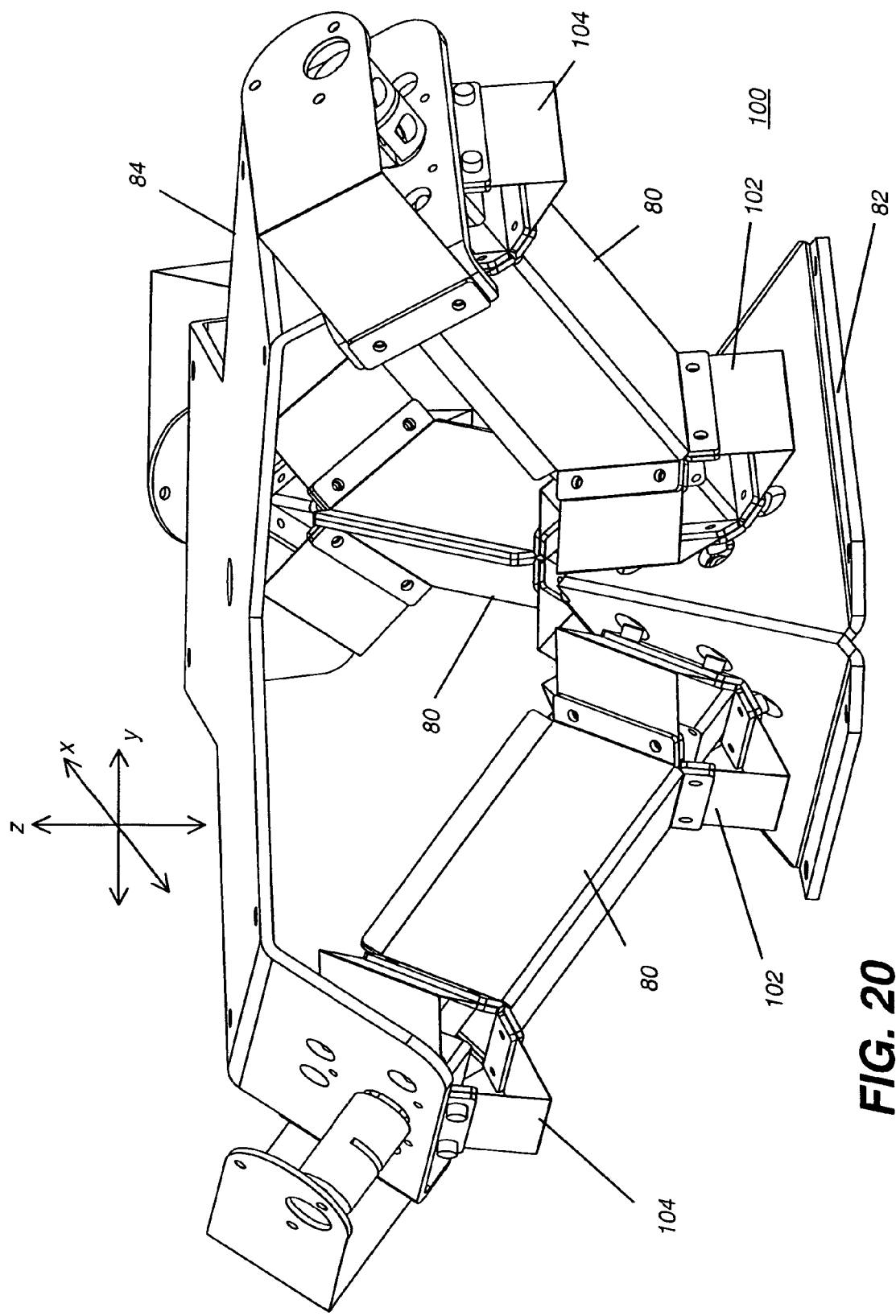
FIG. 20 is a perspective view showing a platform in one embodiment.

In the alternative embodiment of FIG. 20, a platform 84 is fabricated using three flexible shaft couplings 80, without using rotatable shaft 90 or other internal translation actuator for extending or contracting length. Platform 84 provides a stable work surface, taking advantage of the high degree of rotational stiffness of flexible shaft couplings 80 along each of the three coordinate axes x, y, z, with translational degrees of freedom along each axis at the same time.

Figure 22:
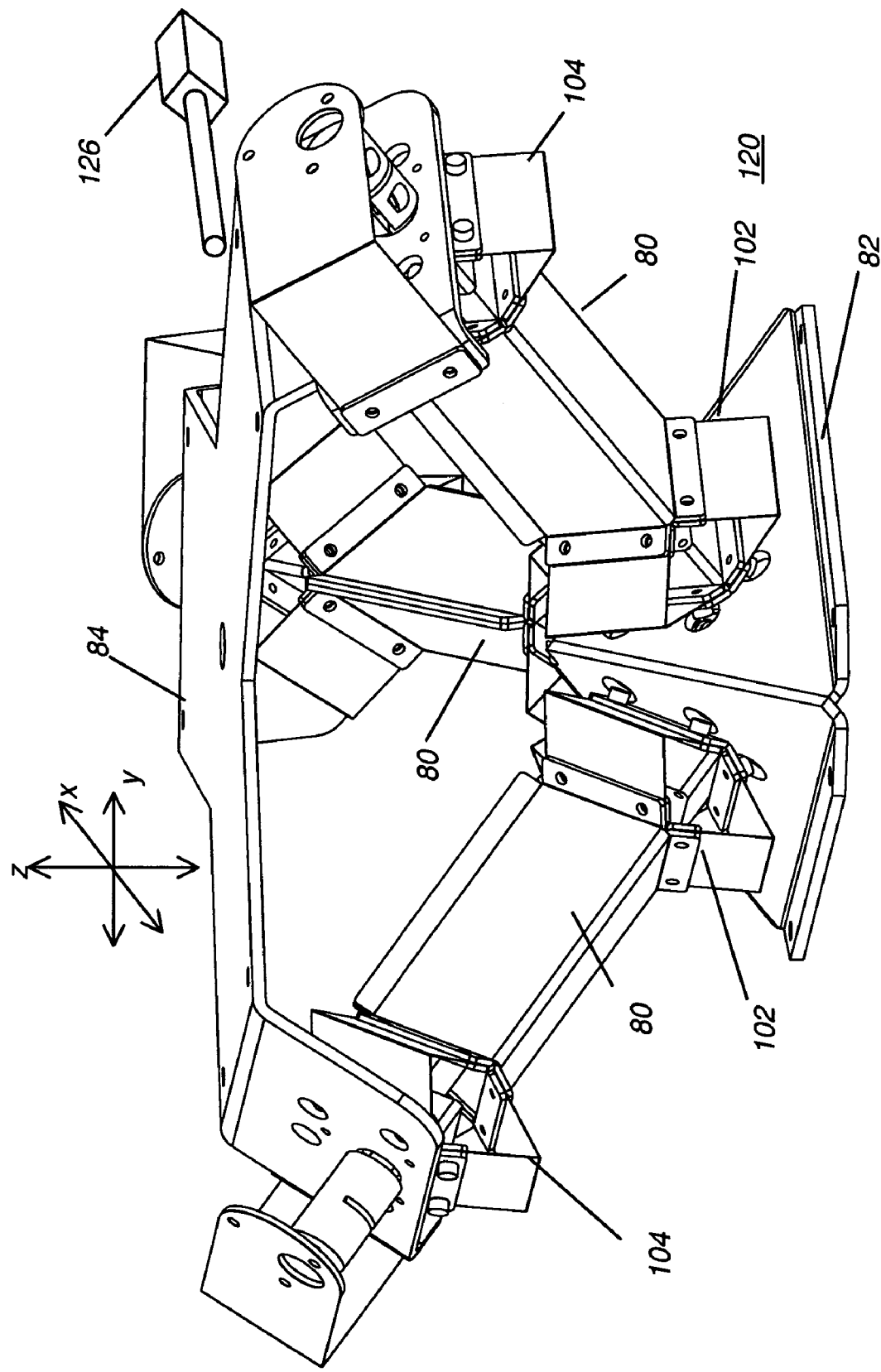
FIG. 22 is a perspective view showing a single-axis positioning apparatus in one embodiment of the present invention.

Platform 84 may also be used with one or more translation actuators that are mounted separately from flexible shaft couplings 80. FIG. 22 shows a single-axis positioning apparatus 120 in which a solenoid 126 is mounted as a translation actuator to provide movement of platform 84 in one direction. As noted above, various types of translation actuators could be used in this way, mounted externally from flexible shaft couplings 80. Alternately, more than one translation actuator could be externally mounted, to provide movement in desired directions, including x, y, z translation, providing comparable motion control capability to that of multi-axis positioning apparatus 100 in FIG. 12, using external translation actuators.

The construction of flexible shaft coupling 80 is advantaged over conventional types of flexible shaft couplings, such as those cited in U.S. Pat. No. 6,757,985 described earlier. The ideal shaft coupling for use in this application would be extremely stiff with respect to rotation along its axis and flexible with respect to other degrees of freedom. With conventional flexible shaft couplings, increased rotational stiffness is typically obtained at the cost of loss of flexibility in the other degrees of freedom. In contrast, flexible shaft coupling 80 of the present invention has increased rotational stiffness with a broadened ranged of flexibility. In particular, flexible shaft coupling 80 is extendible along its axis over a range of lengths, unlike the more restrictive characteristics of conventional flexible couplings. Folded sheet flexures 20 can be fabricated from appropriate materials for obtaining a needed level of stiffness. The entire assembly of flexible shaft coupling 80 could be fabricated from a single piece of sheet metal in one embodiment.

The arrangement of flexible shaft couplings 80 may be varied in many ways from that described in the embodiment of FIG. 12. For example, while the arrangement along three orthogonal axes has mechanical advantages, there may be applications for which a different angular arrangement is more appropriate, based on criteria such as desired range and direction of motion. Whether mounted internal to flexible shaft coupling 80 or mounted externally, various arrangements are possible for using one or more translational actuators.

Motion Control

Figure 21:
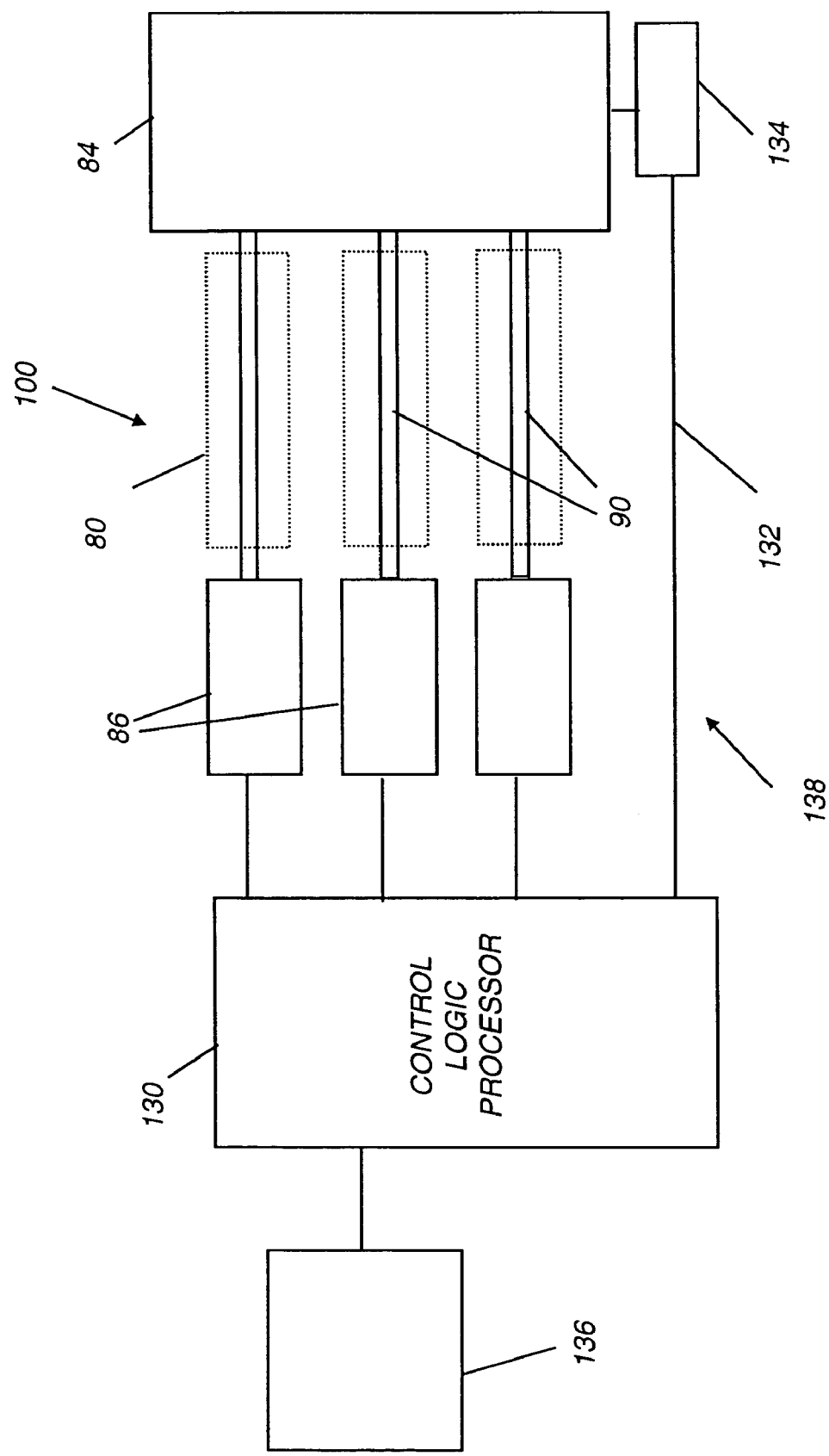
FIG. 21 is a schematic block diagram showing a control loop incorporated into the apparatus of the present invention.

A control loop 138 can also be made part of multi-axis positioning system 100 of the present invention as shown in FIG. 21. Each motor 86 rotates its corresponding shaft 90 through flexible shaft coupling 80. Motor 86 is controlled by command signals from a control logic processor 130 for multi-axis control, using any of a number of commercially available logic and driver components. A feedback line 132 from one or more sensors 134 completes the control loop, allowing platform 84 to be positioned as needed. Sensor 134 may be any of a number of types of positional sensor, including an encoder, a proximity sensor, or photodetector, for example. A user interface 136 may be provided, allowing user commands for control of platform 84 positioning using an interface mechanism such as a conventional mouse, joystick, or other tool. A similar type of motion control could be applied for any translational actuator used, whether internal to or external to flexible shaft coupling 80.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, while optimal performance of folded sheet flexure coupling 40 is obtained when the arrangement of its folded sheet flexures 20 meets the geometric requirements described as items (i)-(iv) above with reference to FIGS. 4 through 7, some tolerance for error and misalignment is permissible, with corresponding degradation of performance. For example, all of the folds 36 for flexure coupling 40 may not be exactly coplanar in a specific instance. In such a case, CV performance for flexure coupling 40 would be compromised, but wind-up stiffness would be maintained. Embodiments shown and described herein use three sheet flexures 20 for each flexure coupling 40, advantageously forming a triangular arrangement. However, each flexure coupling 40 could be formed using three, four, or any larger number of individual sheet flexures 20. The ball-and-socket arrangement of FIG. 10 could be used at either or both ends of flexible shaft coupling 80. Using an appropriate type and arrangement of translational actuators, suitable levels of vibration could be provided to platform 84.

The apparatus and method of the present invention provide a positioning mechanism that is relatively simple, lightweight, and inexpensive, while providing improved performance, range of movement, and flexibility over conventional positioning apparatus designs. Thus, what is provided is an apparatus for precise positioning of a platform in up to three orthogonal axes.

PARTS LIST 10 coupling
12 rigid intermediate member
14 drive member coupling
16 load member coupling
20 folded sheet flexure
21*a* first sheet equivalent structure
21*b* second sheet equivalent structure
22 plate
24 plate
26 surface
28 screw
30 drive member
32 load member
36 fold
40 flexure coupling
42 hinge
50 flexure coupling
52 ball-and-socket joint
54 drive hub
56 ball member
58 load hub
60 socket member
62*a* linearly elongated member
62*b* linearly elongated member
64 linearly elongated member
66 fastener
70 two-sheet flexure equivalent member
72 first member
74 second member
80 flexible shaft coupling
82 base
84 platform
86 motor
88 bracket
90 shaft
92 threaded portion
94 fitting
96 thrust bearing connection
98 half-nut
100 multi-axis positioning apparatus
102 base coupling
104 platform coupling
106 socket
108 end-plate
110 pin
112 cup
114 bearing
116 end-plate
118 socket
120 single-axis positioning apparatus
126 solenoid
130 control logic processor
132 feedback line
134 sensor
136 user interface
138 control loop

The invention claimed is:

1. An apparatus for supporting a platform relative to a base, comprising first, second, and third flexible shaft couplings, each flexible shaft coupling mechanically coupled between the platform and the base, each flexible shaft coupling comprising:
   a) a rigid intermediate member;
   b) a platform coupling comprising a plurality of folded sheet flexures, wherein each folded sheet flexure is:
      i) coupled to the rigid intermediate member on one side of a fold; and
      ii) coupled to the platform on the opposite side of the fold;
   c) a base coupling comprising a plurality of folded sheet flexures, wherein each folded sheet flexure is:
      i) coupled to the rigid intermediate member on one side of a fold; and
      ii) coupled to the base on the opposite side of the fold.

2. The apparatus of claim 1 wherein the rigid intermediate member is a polygonal cylinder.

3. The apparatus of claim 1 wherein for the platform coupling, the folds for the plurality of folded sheet flexures are substantially coplanar in a plane substantially orthogonal to an axis between the platform and the rigid intermediate member.

4. The apparatus of claim 3 wherein each said fold lies substantially along a tangent to a circle in said plane, said circle being substantially centered about the axis.

5. The apparatus of claim 1 wherein for the base coupling, the folds for the plurality of folded sheet flexures are substantially coplanar in a plane substantially orthogonal to an axis between the base and the rigid intermediate member.

6. The apparatus of claim 5 wherein each said fold lies substantially along a tangent to a circle in said plane, said circle being substantially centered about the axis.

7. The apparatus of claim 1 wherein the platform coupling comprises three folded sheet flexures.

8. The apparatus of claim 1 wherein at least one of the folded sheet flexures is comprised of sheet metal.

9. The apparatus of claim 1 wherein at least one of the folded sheet flexures comprises a hinge.

10. The apparatus of claim 1 wherein at least one of the folded sheet flexures is formed by an attachment of two or more separate pieces of sheet material.

11. A coupling according to claim 10 wherein the attachment is made at the fold.

12. The apparatus of claim 1 wherein at least one of the folded sheet flexures comprises at least one wire segment.

13. The apparatus of claim 1 wherein at least one of the folded sheet flexures comprises two sheet equivalent structures coupled by a hinge and wherein each sheet equivalent structure comprises a plurality of longitudinally extended members coupled to the hinge.

14. The apparatus of claim 1 further comprising, for at least one of said flexible shaft couplings:
a rotatable shaft extending through the at least one flexible shaft coupling; and
a motor coupled to the shaft for adjusting the length of the at least one flexible shaft coupling.

15. An apparatus according to claim 1 wherein the platform coupling further comprises a ball-and-socket element disposed between the platform and the rigid intermediate member.

16. An apparatus according to claim 1 wherein for at least one of the first, second, and third flexible shaft couplings, the base coupling further comprises a ball-and-socket element disposed between the base and the rigid intermediate member.

17. The apparatus of claim 1 further comprising, for at least one of said flexible shaft couplings:
a shaft extending through a portion of the at least one flexible shaft coupling; and
a translational actuator coupled to the shaft for adjusting the length of the at least one flexible shaft coupling.

18. The apparatus of claim 1 further comprising, for at least one of said flexible shaft couplings a translational actuator for controlling the axial extension of the shaft coupling.

19. The apparatus of claim 1 further comprising at least one translational actuator for moving the platform in a direction.

20. The apparatus of claim 19 wherein the at least one translational actuator is taken from the group comprising a motor, a piezoelectric actuator, a solenoid, a voice coil, and a hydraulic actuator.

21. An apparatus for positioning a platform relative to a base, comprising first, second, and third flexible shaft couplings, each flexible shaft coupling mechanically coupled between the platform and the base, each flexible shaft coupling comprising:
a) a rigid intermediate member;
b) a platform coupling comprising a plurality of folded sheet flexures, wherein each folded sheet flexure is:
i) coupled to the rigid intermediate member on one side of a fold; and
ii) coupled to the platform on the opposite side of the fold;
c) a base coupling comprising a plurality of folded sheet flexures, wherein each folded sheet flexure is:
i) coupled to the rigid intermediate member on one side of a fold; and
ii) coupled to the base on the opposite side of the fold; and
wherein, for at least one of the first, second, and third flexible shaft couplings:
a translational actuator is coupled to a shaft, the shaft extending substantially axially through the at least one flexible shaft coupling for adjusting the length of the at least one flexible shaft coupling.

22. An apparatus for positioning a platform relative to a base, comprising first, second, and third flexible shaft couplings, each flexible shaft coupling mechanically coupled between the platform and the base, each flexible shaft coupling comprising:
a) a rigid intermediate member;
b) a platform coupling comprising a plurality of folded sheet flexures, wherein each folded sheet flexure is:
i) coupled to the rigid intermediate member on one side of a fold; and
ii) coupled to the platform on the opposite side of the fold;
c) a base coupling comprising a plurality of folded sheet flexures, wherein each folded sheet flexure is:
i) coupled to the rigid intermediate member on one side of a fold; and
ii) coupled to the base on the opposite side of the fold;
d) a translational actuator coupled to a shaft extending axially through each flexible shaft coupling for adjusting the length of the flexible shaft coupling; and
the apparatus further comprising at least one sensor for sensing platform movement and providing a sensor signal to a control logic processor that provides a command signal to the translational actuator.

* * * * *